US012025547B2

(12) United States Patent
Morgan et al.

(10) Patent No.: US 12,025,547 B2
(45) Date of Patent: Jul. 2, 2024

(54) IMPEDANCE FLOW CYTOMETRY APPARATUS

(71) Applicant: University of Southampton, Southampton (GB)

(72) Inventors: Hywel Morgan, Southampton (GB); Daniel Spencer, Southampton (GB)

(73) Assignee: University of Southampton, Southampton (GB)

( * ) Notice: Subject to any disclaimer, the term of this patent is extended or adjusted under 35 U.S.C. 154(b) by 728 days.

(21) Appl. No.: 17/276,697

(22) PCT Filed: Sep. 16, 2019

(86) PCT No.: PCT/GB2019/052592
§ 371 (c)(1),
(2) Date: Mar. 16, 2021

(87) PCT Pub. No.: WO2020/058681
PCT Pub. Date: Mar. 26, 2020

(65) Prior Publication Data
US 2022/0050042 A1    Feb. 17, 2022

(30) Foreign Application Priority Data
Sep. 17, 2018 (GB) ..................... 1815114

(51) Int. Cl.
*G01N 15/1031* (2024.01)
*B01L 3/00* (2006.01)
(Continued)

(52) U.S. Cl.
CPC .... *G01N 15/1031* (2013.01); *B01L 3/502715* (2013.01); *B01L 3/502761* (2013.01);
(Continued)

(58) Field of Classification Search
CPC ........ G01N 15/1031; G01N 2015/1006; B01L 3/502715; B01L 3/502761; B01L 2300/0645
See application file for complete search history.

(56) References Cited

U.S. PATENT DOCUMENTS

| 4,513,280 A * | 4/1985 | Hannan ............... G01N 27/4162 324/438 |
| 2011/0235030 A1* | 9/2011 | Champseix ........ G01N 15/1456 356/243.2 |

(Continued)

FOREIGN PATENT DOCUMENTS

| EP | 2755025 | 7/2014 |
| EP | 3418718 | 12/2018 |
| WO | 03048728 | 6/2003 |
| WO | 2012164547 | 12/2012 |
| WO | 2014170625 | 10/2014 |

OTHER PUBLICATIONS

International Search Report and Written Opinion for corresponding International Patent Application No. PCT/GB2019/052592, dated Feb. 13, 2020.
(Continued)

*Primary Examiner* — Paresh Patel
(74) *Attorney, Agent, or Firm* — Renner, Otto, Boisselle & Sklar, LLP

(57) ABSTRACT

Impedance flow cytometry apparatus comprises: a flow channel for carrying a flow of fluid comprising particles suspended in an electrolyte from an inlet to an outlet; a first electrode group and a second electrode group, each electrode group providing first and second current paths through fluid flowing in the flow channel; wherein each electrode group comprises: a first signal electrode to provide to the first current path a first electrical signal of frequency, magnitude and phase; a second signal electrode to provide to the second current path a second electrical signal of substantially equal frequency and magnitude as the first electrical signal and of
(Continued)

opposite phase to the first electrical signal; and one or more measurement electrodes to detect current flow in the first current path and the second current path and produce a summed signal representing the sum of the current flow in the first current path and the current flow in the second current path; wherein the first electrode group produces a first summed signal and the second electrode group produces a second summed signal; and circuitry to determine a differential signal representing the difference between the first summed signal and the second summed signal.

29 Claims, 10 Drawing Sheets

(51) Int. Cl.
  *G01N 15/10* (2006.01)
  *G01N 15/1434* (2024.01)
(52) U.S. Cl.
  CPC .. *G01N 15/1436* (2013.01); *B01L 2300/0645* (2013.01); *G01N 2015/1006* (2013.01)

(56) References Cited

U.S. PATENT DOCUMENTS

| | | | |
|---|---|---|---|
| 2019/0137380 A1* | 5/2019 | Brown | G01N 15/1031 |
| 2021/0072137 A1* | 3/2021 | Michel | G01N 15/1031 |
| 2021/0148805 A1* | 5/2021 | Kashanin | G01N 15/1023 |
| 2022/0034781 A1* | 2/2022 | Morgan | G01N 15/12 |
| 2023/0140713 A1* | 5/2023 | Sutton | C12Q 1/18 |
| | | | 435/32 |
| 2023/0358663 A1* | 11/2023 | Abbasi | G01N 15/0266 |

OTHER PUBLICATIONS

UK Combined Search and Examination Report, issued in Application No. GB1815114.2, dated Mar. 15, 2019.

Lanz T., et al: "Differential impedance spectrometer and vision system for analysis of single cells," Transducers 2009: 2009 International Solid-State Sensors, Actuators and Microsystems Conference; Denver, Colorado, USA, Jun. 21-25, 2009, IEEE, Piscataway, NJ, USA, Jun. 21, 2009 (Jun. 21, 2009); pp. 1297-1300, XP031545779, ISBN: 978-1-4244-4190-7.

* cited by examiner

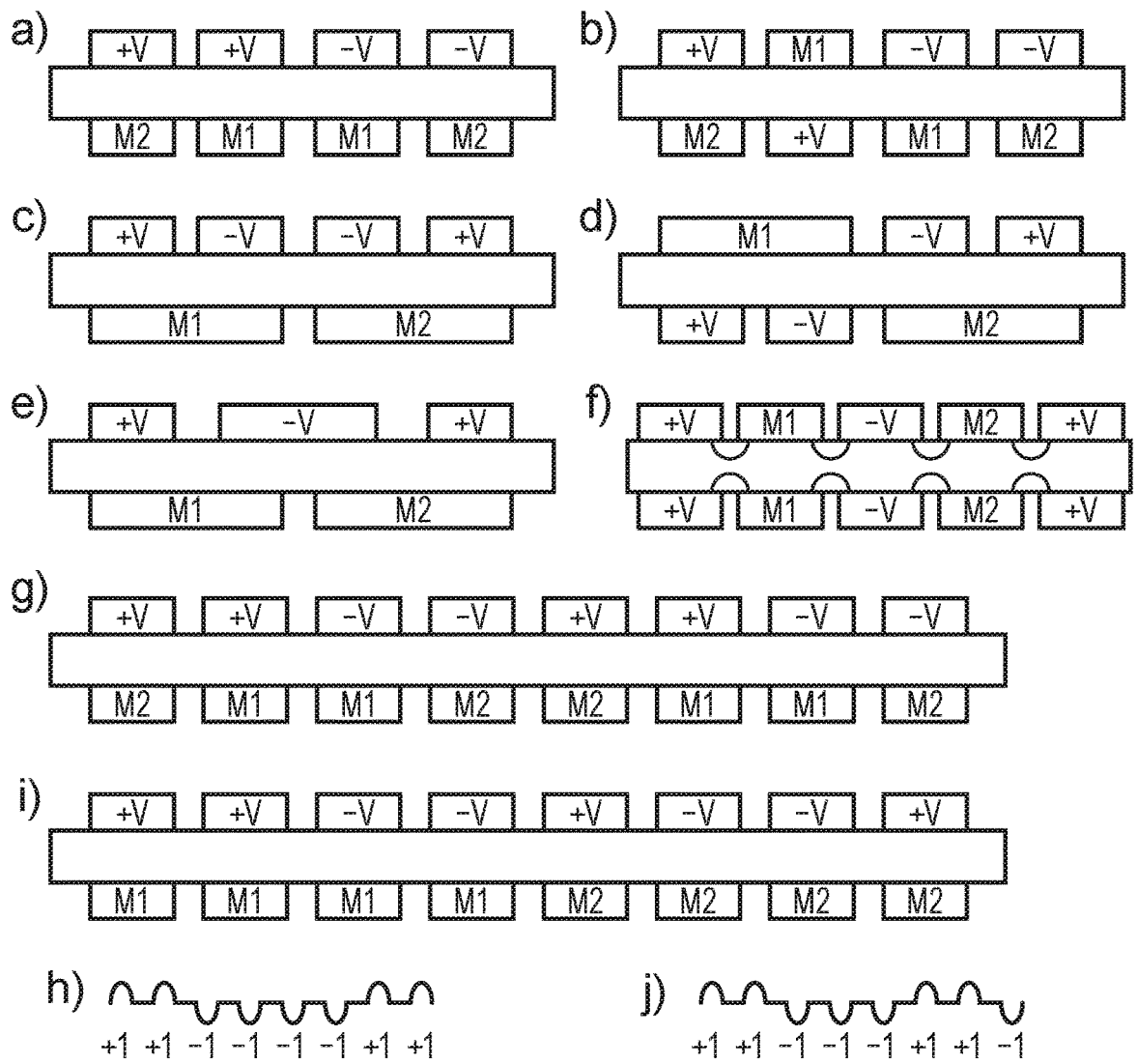
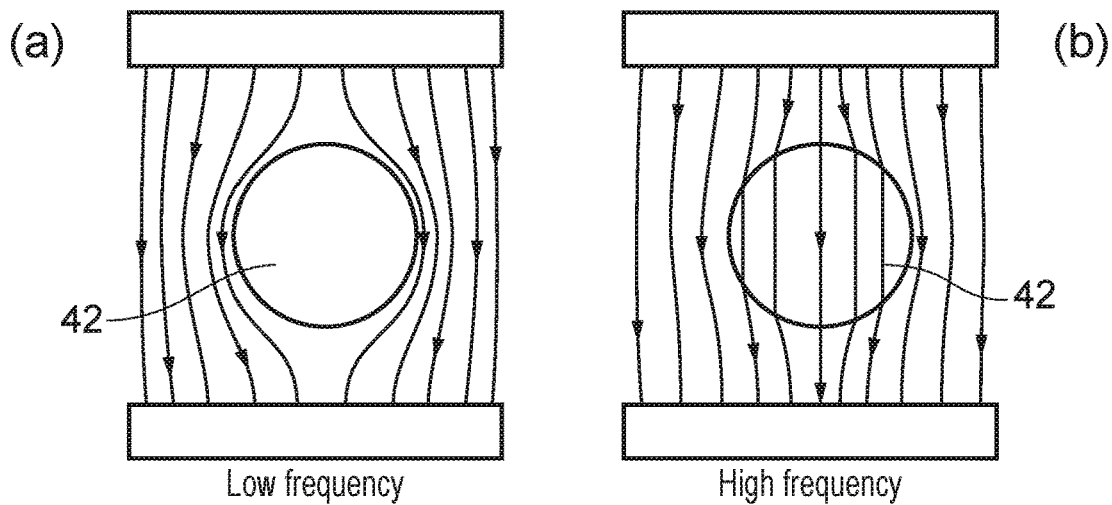
FIG. 9

IMPEDANCE FLOW CYTOMETRY APPARATUS

This application is a national phase of International Application No. PCT/GB2019/052592 filed on Sep. 16, 2019, which claims priority to GB Application No. 1815114.2 filed on Sep. 17, 2018.

BACKGROUND OF THE INVENTION

The present invention relates to impedance flow cytometry apparatus.

Antimicrobial resistance (AMR) is the ability of a microorganism to stop an antimicrobial from working against it. Of particular concern is a rise in the spread of resistant bacteria, which is set to become a major medical and economic problem for the world. When an infection is suspected, a doctor often immediately prescribes antimicrobials with the aim of providing prompt treatment. However, in many cases the antimicrobials are not needed, or are inappropriate for the particular infection-causing organism. One problem is treatment of bacterial infections with antibiotics which are ineffective owing to the presence of resistance mechanisms; this can mean the infection may persist and possible spread to others. A main reason for the behavior of rapid prescribing of potentially ineffective antibiotics is that diagnostic tests for checking resistance traits are far too slow to be useful in informing prescribing when the patient initially presents for treatment.

Typically, antibiotic susceptibility tests measure bacterial growth in the presence of antibiotics in liquid cultures or on solid agar plates. A common test known as a disk diffusion test (or variations of this test principle called Etests) requires that a bacterial culture be grown overnight to obtain a sample which is then placed on an agar plate. Strips containing known concentrations of antibiotics are placed on the agar plate, and bacterial growth close to the strips containing antibiotics is measured after a long growth period. Broth microdilution measures the growth of bacteria in liquid cultures with different concentrations of antibiotics and is often performed in automated laboratory equipment. These conventional assays measure the growth of populations of bacteria over time and take many hours to perform. The results cannot therefore be used to inform prescription in the early stages of infection, which is most important.

As an alternative to these conventional tests which measure populations of bacteria, analysing the optical properties of single bacteria exposed to antibiotics has been demonstrated to correlate closely with the antibiotic susceptibility measured with the conventional tests, but within a shorter time window of less than one hour [1]. Commonly, a population of bacteria is exposed to an antibiotic for a fixed duration of time, typically thirty minutes. The bacteria are then washed by centrifugation to remove the antibiotic, and stained with a specific membrane-permeable fluorescent dye that can be used to indicate viability to the antibiotic. The optical properties of the bacteria are measured with an optical flow cytometer, which detects light scattered from the bacteria in a forward direction that indicates cell size, and a fluorescence signal that indicates viability. The optical data is compared with data obtained from a population of the same sample of bacteria, also stained with dye but which has not been exposed to the antibiotic. Differences in the data from the two samples indicate whether the bacteria are susceptible to the antibiotic. Additionally, exposure of samples to different concentrations of antibiotic is used to determine a minimum dose of antibiotic required to effectively inhibit the bacterial growth. Optical cytometry has a number of drawbacks. The use of dyes requires one or more wash steps in the procedure, which limits the scope for miniaturising and automating the testing. Removal of the antibiotic by washing prior to addition of the dye suspends the antibiotic treatment at that moment, so it is not possible to continuously measure antibiotic effect on a single sample over time. Optical cytometers are bulky and very costly, and require manipulation techniques such as acoustic focusing to correctly position the bacteria within an optical analysis zone. The fluorescent dyes are also expensive. Hence, optical cytometry is not well-suited for the analysis of antimicrobial susceptibility at the point of need.

New approaches able to increase the speed and reduce the cost of the analysis of antimicrobial testing, and hence guide appropriate antimicrobial prescription, are therefore required.

SUMMARY OF THE INVENTION

Aspects and embodiments are set out in the appended claims.

According to a first aspect of certain embodiments described herein, there is provided flow cytometry apparatus comprising: a flow channel for carrying a flow of fluid comprising particles suspended in an electrolyte from an inlet to an outlet; a first electrode group and a second electrode group, each electrode group providing first and second current paths through fluid flowing in the flow channel; wherein each electrode group comprises: a first signal electrode to provide to the first current path a first electrical signal of frequency, magnitude and phase; a second signal electrode to provide to the second current path a second electrical signal of substantially equal frequency and magnitude as the first electrical signal and of opposite phase to the first electrical signal; and one or more measurement electrodes to detect current flow in the first current path and the second current path and produce a summed signal representing the sum of the current flow in the first current path and the current flow in the second current path; wherein the first electrode group produces a first summed signal and the second electrode group produces a second summed signal; and circuitry to determine a differential signal representing the difference between the first summed signal and the second summed signal.

According to a second aspect of certain embodiments described herein, there is provided a microfluidic device for use in flow cytometry and comprising: a layered substrate having a fluid flow channel defined in a layer of the substrate and having an inlet and an outlet, the inlet for receiving fluid comprising cells suspended in an electrolyte to flow along the flow channel to the outlet; electrodes deposited as layers above and below the flow channel, the electrodes comprising: a first electrode group and a second electrode group, each electrode group providing first and second current paths through fluid flowing in the flow channel; wherein each electrode group comprises: a first signal electrode to provide to the first current path a first electrical signal of frequency, magnitude and phase; a second signal electrode to provide to the second current path a second electrical signal of substantially equal frequency and magnitude as the first electrical signal and opposite in phase to the first electrical signal; and one or more measurement electrodes to detect current flow in the first current path and the second current path; input electrical connections configured to enable the connection of one or more electrical signal sources to supply the first and second electrical signals to the first and second signal electrodes; and output electrical connections configured to connect the measurement electrodes to circuitry operable to produce, for each electrode group, a summed signal representing the sum of the current flow in the first current path and the current flow in the second current path, wherein the first electrode group produces a first summed signal and the second electrode group produces a second summed signal, and also to determine a differential signal representing the difference between the first summed signal and the second summed signal.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, flow cytometry apparatus may be provided in accordance with approaches described herein which includes any one or more of the various features described below as appropriate.

BRIEF DESCRIPTION OF THE DRAWINGS

For a better understanding of the invention and to show how it may be carried into effect, reference is now made by way of example to the accompanying drawings in which:

FIGS. 8 (a) to (g) and 8 (i) show highly schematic representations of further example configurations of electrodes for an impedance flow cytometer;

FIGS. 8 (h) and (j) show differential signals which may be obtained using the example electrode configurations of FIGS. 8 (g) and 8 (i) respectively;

FIGS. 9 (a) and (b) show schematic depictions of the interaction of a cell with an electric field at low and high frequencies;

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Disc diffusion, broth microdilution and optical flow cytometry are examples of testing procedures for determining the susceptibility of bacteria to antibiotics. A further example is impedance flow cytometry. This technique uses apparatus to measure electrical properties, specifically a frequency dependent impedance, of individual particles (cells, bacteria) flowing in a microfluidic channel. Exposure to antibiotics can alter the impedance characteristics of bacteria, so detection of a change in impedance can indicate susceptibility to an antibiotic under test.

Figure 1:
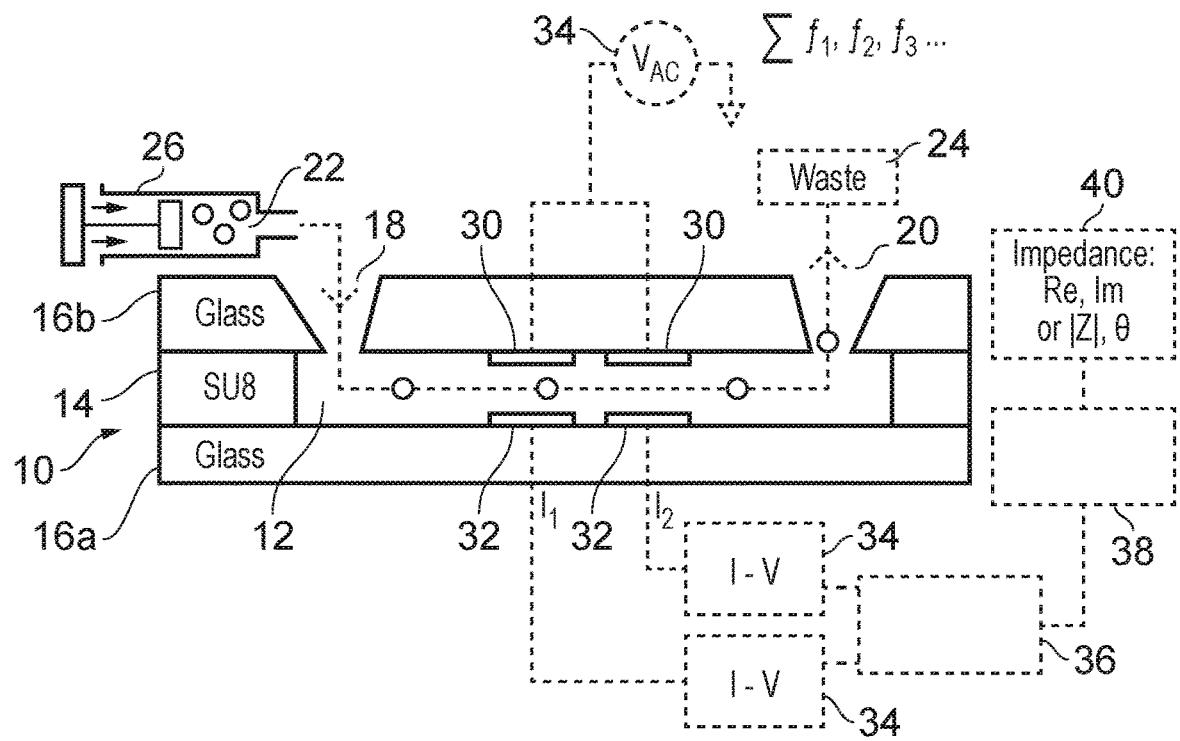
FIG. 1 shows a schematic cross-sectional side view of an example of an impedance flow cytometry apparatus.

FIG. 1 shows a simplified schematic cross-sectional side view of an example of apparatus for impedance flow cytometry. The apparatus is typically constructed as a microfluidic device formed from various layers deposited on a substrate and patterned using techniques such as photolithography to form required structures. The field of microfluidics is concerned with the behaviour, control and manipulation of fluids which are confined or constrained on a small scale, typically sub-millimetre, in other words on the micro-millimetre or smaller scale. Microfluidic devices constructed from layers on a substrate for the purpose of sample testing, in the biological and medical fields as well as other areas of endeavour, are sometimes referred to as "lab-on-a-chip" devices. In the FIG. 1 example, the device 10 comprises a microfluidic flow channel 12 formed within a layer 14 of photoresist material, such as SU8, an epoxy-based negative photoresist, which is sandwiched between a lower layer 16a and an upper layer 16b of a glass material. Apertures in the upper glass layer 16a define an inlet 18 to the channel 12 and an outlet 20 from the channel 12. A fluid sample 22 can be delivered into the channel 12 at the inlet 18 for flow along the channel 12 (indicated by dotted arrows in FIG. 1) to the outlet 20 where it is removed or expelled as a waste product 24 or collected for further analysis. The sample 22 can be provided into the channel 12 by any convenient method, such as injection into the inlet 18 from a syringe 26. A sheath flow may or may not be used to centre particles within the bore or orifice of the channel. Other mechanisms may be used to focus particles in the flow such as dielectrophoresis, acoustic, inertial or viscoelastic techniques.

The sample 22 comprises particles, which may be cells or other biological particles (such as algae, exosomes, viruses or vesicles) or non-biological particles (such as droplets, beads, colloids, dust or metal fragments), depending on the nature of the testing being carried out, suspended in an electrolyte (electrolytic fluid). To accommodate the passage of cells, the channel may have a cross-section in the direction transverse to the flow direction (from inlet to outlet) measuring around 40 µm high and around 40 µm wide. More generally, channel dimensions might be in the range of 1 to 100 µm. The cross-section may or may not be square.

The device 10 further comprises a first and a second pair of electrodes fabricated on the bottom and top walls of the channel 12. Each pair of electrodes comprises a voltage electrode 30 and a measurement electrode 32. In the illustrated example of FIG. 1, the voltage electrode 30 is on the top wall of the channel 12 and the measurement electrode 32 is on the bottom wall of the channel 12, but these positions may be reversed. The first electrode pair is located at an upstream position in the channel 12, and the second electrode pair is located at a downstream position, so that particles in sample flow past the first electrode pair before the second electrode pair. The electrodes may have dimensions of the order 1 to 100 µm, such as 10 to 40 µm, although larger or smaller sizes are also possible depending on the channel size.

The voltage electrodes 30 are driven with a single voltage source 34 that may generate one or more frequency components $f_1, f_2, f_3$ . . . . Hence, both voltage electrodes 30 provide the same voltage, approximately equal in magnitude, frequency and phase. The two electrodes 30, 32 in each pair provide or define a current path across the flow channel 12 from the voltage electrode 30 to the measurement electrode 32, in the presence of the electrolytic fluid of a sample 22 flowing in the flow channel 12. Current flowing in these current paths is detected at the measurement electrodes 32. Current I1 detected at the first measurement electrode and current I2 detected at the second measurement electrode are each passed to a separate current-to-voltage converter 34. The outputs of converters are passed to a differential amplifier 36 to obtain a differential signal representing the difference between the currents in the two current paths, namely I2−I1 (or I1−I2 if preferred). Further electronics (circuitry, a lock-in amplifier 38, a processor 40, for example), receive the differential signal and determine from it a measurement of impedance. This output or impedance signal may separate the impedance measurements according to the real (Re) and Imaginary (Im) components, or the magnitude |Z| and phase θ, as preferred. Particles passing between the electrodes of an electrode pair will alter the current detected at the measurement electrode, which is reflected in the final impedance signal.

The inclusion of two pairs of electrodes gives two measurable currents and enables the differential mode of operation noted above, to reduce noise and artefacts. The purpose of the differential signal can be understood with reference to FIGS. 2 and 3.

Figure 2:
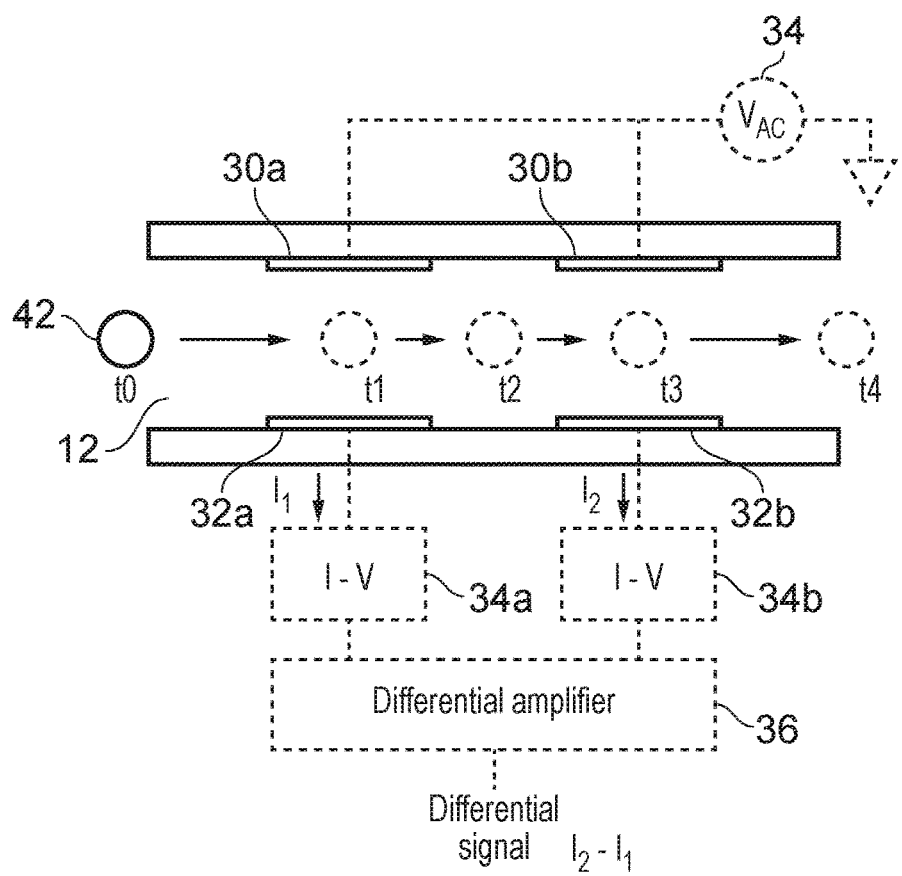
FIG. 2 shows a schematic cross-sectional side view of part of the apparatus of FIG. 1.
Figure 3:
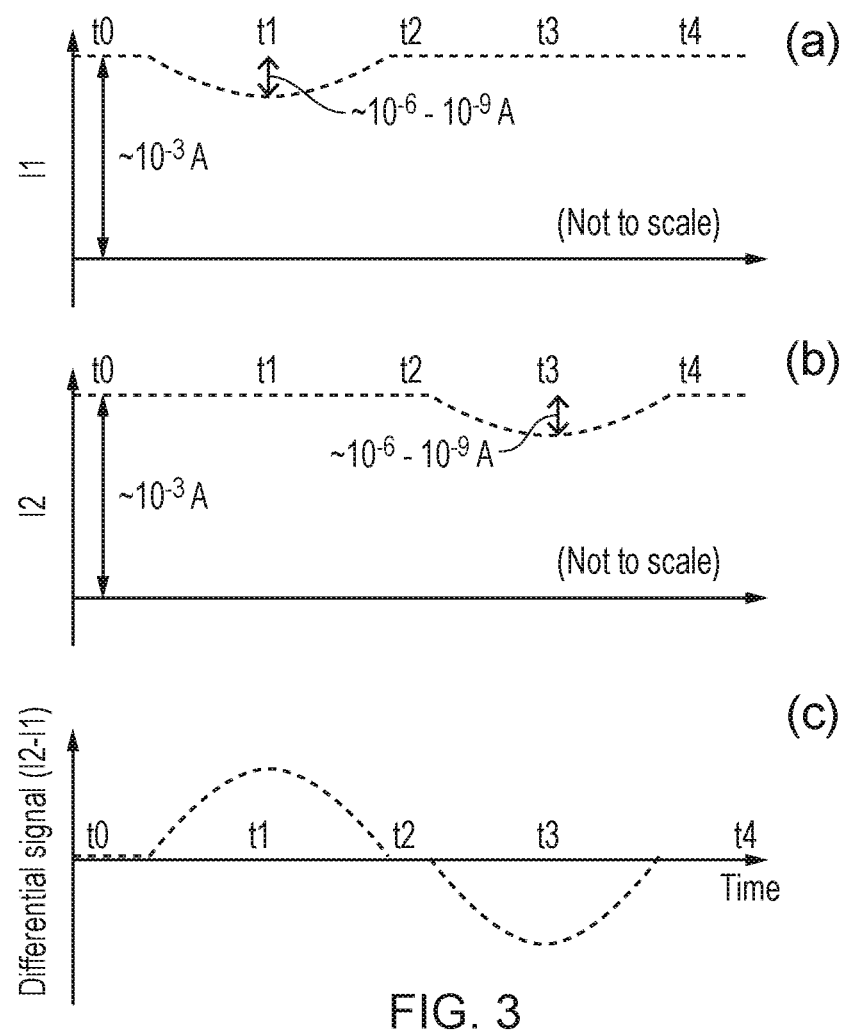
FIGS. 3 (a) to (c) show graphs of current against time and differential current against time measured with the apparatus of FIGS. 1 and 2.

FIG. 2 shows a schematic enlarged view of part of the device of FIG. 1, including the two electrode pairs, arranged across the flow channel 12. A particle 42 is suspended in fluid flowing along the channel 12. FIG. 3 shows graphs of the detected current over time during an impedance measurement. FIG. 3(a) shows the current I1 detected by the first measurement electrode 32a. FIG. 3(b) shows the current I2 detected by the second measurement electrode 32b. FIG. 3(c) shows the differential signal obtained from the differential amplifier (or other circuitry able to determine a difference signal), representing the difference between the two currents, I2−I1.

At a time t0, the particle 42 is in the channel but yet to encounter the electrodes. Both measurement electrodes 32a, 32b therefore detect substantially the same, non-zero, current since the same voltage (nominally) is supplied to both current paths. Therefore, the differential signal is substantially zero. At a later time t1, the particle 42 passes between the electrodes 30a, 32a of the first electrode pair. It impedes current flow in the first current path, and the detected I1 is reduced, as shown in FIG. 3(a). The second current I2 is largely unaffected by the particle 42. Therefore, the differential signal I2−I1 becomes positive as the particle 42 passes the first electrode pair 30a, 32b, as shown in FIG. 3(c). Then at time t2, the particle is at an intermediate point after the first electrode pair 30a, 32a and before the second electrode pair 30b, 32b, so both currents are again approximately equal and the differential signal returns to zero. At time t3, the particle 42 reaches the second electrode pair 30b, 32b, and impedes the current flow in the second current path. Hence, at t3, the first current I1 has its full value (see FIG. 3(a)), the second current I2 has a reduced value (see FIG. 3(b), and the differential signal becomes negative (see FIG. 3(c)). At time t4, the particle 42 has flowed out of the measurement region or zone defined by the electrodes, neither current path is affected by the particle 42, and the differential signal is again zero. Appropriate processing of the differential signal can be carried out to deduce the impedance of the particle. The size, structure, shape and composition of the particle determine its impedance properties and hence the effect it has on the current in the current paths defined by the electrode pairs, and on the differential signal. Certain particle properties show a frequency-dependent response, so utilisation of a voltage with appropriate single or multiple frequency components and processing of the differential signal to extract the impedance response at different frequencies can reveal additional information about the particles.

The currents in the two current paths are typically in the range of 1 to 10 mA, depending on the conductivity of the suspending electrolyte, the dimensions of the channel and the electrodes, and the applied voltage signal. However, the change in the current produced by a passing particle of a small size may be in the range of about 1 µA to 1 nA, i.e. between about a thousand to a million times smaller (note that the current plots in FIGS. 3(a) to (c) are not to scale). The differential signal therefore has a very small magnitude and is highly susceptible to noise. In order to maximise the signal-to-noise ratio of the differential signal, the voltage applied to the voltage electrodes should be as high as possible and the gain in the current-to-voltage converters should be maximised. However, as the applied voltage is increased, each of I1 and I2 are increased proportionally, and this leads to clipping in the current to voltage converters and the differential amplifier. Overall, the non-zero currents limit the maximum voltage and gain which can be used, which in turn limits the sensitivity of the device. Accordingly, it can be difficult to use an apparatus such as the FIG. 1 example to make measurements on bacterial cells, which are smaller than normal cells. Another approach for measuring small particles such bacteria would be to significantly reduce the channel size so as to shorten the current paths between the electrodes, so that the small-sized bacteria have a proportionally greater impact on the detected current (since the size of the bacteria relative to the channel size is greater). However, narrower channels are prone to blockages, and also increase the backpressure in the channel since this scales with the fourth power of channel size.

Accordingly, an impedance flow cytometer configured as in FIG. 1 is not well-suited for measuring particles of a small size, such as bacterial samples.

The present disclosure describes examples of an alternative impedance flow cytometer which is capable of accurately measuring samples comprising small particles such as bacteria and/or cells, (or indeed any biological or non-biological particles) in large diameter channels (although smaller channel sizes are not excluded). The device comprises electrodes disposed to create current paths through a microfluidic channel, where the electrodes are configured and driven to provide an improved measurement sensitivity.

Cytometers as disclosed herein are well-adapted for making measurements of samples containing bacteria, such as tests and assays to establish whether a bacteria is susceptible to a particular antibiotic. Exposure of a bacterial cell to an antibiotic to which the bacteria is susceptible will modify the size, structure, shape and/or composition of the bacterial cell, so that its impedance properties are altered. This is reflected in the differential signal obtained from the cytometer. Accordingly, comparison of the differential signal from a sample of bacteria that has been exposed to antibiotic to that from a sample of bacteria that has not been exposed to antibiotic can indicate whether the bacteria has any susceptibility to that antibiotic. Certain cell properties that are modified by antibiotic treatment show a frequency-dependent response, so utilisation of a voltage with appropriate single or multiple frequency components and processing of the differential signal to extract the impedance response at different frequencies can reveal additional information about susceptibility.

Figure 4:
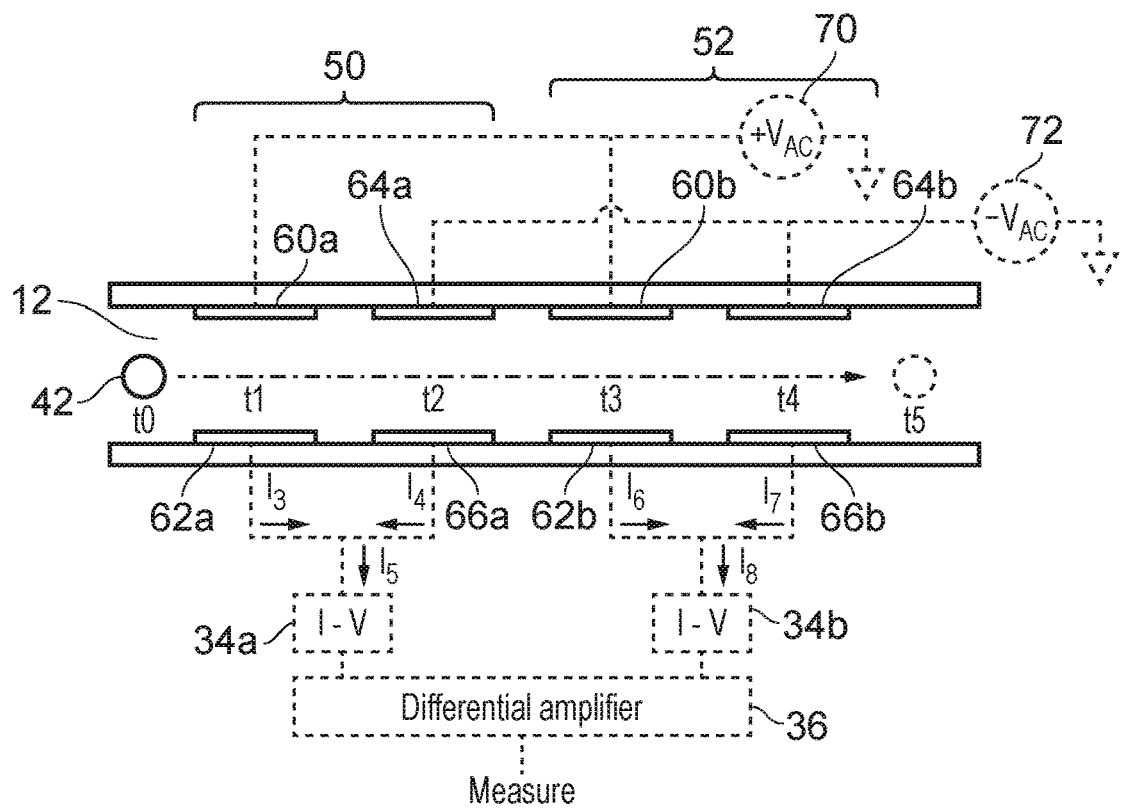
FIG. 4 shows a schematic cross-sectional side view of an electrode and circuitry configuration for an impedance flow cytometer according to a first example of an electrode arrangement.

FIG. 4 shows a schematic cross-sectional side view of a channel with electrodes according to a first such example. The channel and electrodes may be embodied in a microfluidic chip structure such as that shown in FIG. 1, although other structures and configurations may be used instead. The channel 12 has, in this example, a total of eight associated electrodes. Each electrode is on an inner surface of a flow channel 12 so that it is contact with sample fluid flowing in the flow channel 12. Alternatively the electrodes could be thinly separated from the electrolytic sample fluid.

The electrodes are configured as a first electrode group 50 and a second electrode group 52. The electrodes are configured as either signal electrodes for applying an electrical signal (current or voltage) or measurement electrodes, arranged in pairs to provide current paths through fluid flowing in the channel 12. Each of the first electrode group 50 and the second electrode group 52 provides a first current path from a signal electrode to a measurement electrode, and a second current path from a different signal electrode to a measurement electrode. In the present example, each of these electrodes is separate element. Hence, each electrode group comprises four electrodes, and the device comprises a total of eight electrodes. The first electrode group 50 comprises a first signal electrode 60a above the channel 12 that makes a first current path I3 with a first measurement electrode 62a below the channel 12, and a second signal electrode 64a above the channel 12 that makes a second current path I4 with a second measurement electrode 66a below the channel 12. The second electrode group 52 comprises a further first signal electrode 60b above the channel 12 that makes a further first current path 16 with a further first measurement electrode 62b below the channel 12, and a further second signal electrode 64b above the channel 12 that makes a further second current path I7 with a further second measurement electrode 66b below the channel 12. In this example, the electrodes are arranged in pairs along the flow channel length, so that the further second current path is downstream of the further first current path which is downstream of the second current path which is downstream of the first current path.

Within the first electrode group 50, the first signal electrode 60a is driven with a first voltage +V, which has a specified magnitude, phase and frequency composition (one or more frequencies). In contrast, the second signal electrode 64a is driven with a second voltage −V which has the same magnitude and frequency composition as the first voltage +V, but which is 180° ($\pi$ radians) out of phase with the first voltage.

The signal electrodes of the second electrode group 52 are driven with the same voltages as the corresponding signal electrodes of the first electrode group 50. Hence, the further first signal electrode 60b is driven with +V and the further second signal electrode is driven with −V, where the magnitudes and frequencies are identical with the first and second voltages of the first electrode group 50. In the FIG. 4 example, this is achieved by supplying the first signal electrode 60a and the further first signal electrode 60b from a first voltage source 70 producing +V, and supplying the second signal electrode 64a and the further second signal electrode 64b from a separate second voltage source 72 producing −V.

Note that it is not essential that the magnitude and frequencies are absolutely identical, and in real-world conditions it is likely that some small differences will occur. Hence, terms such as "same" and "identical" in this context are not limiting, and are intended to include arrangements in which the voltage characteristics are similar or approximately, substantially or nominally the same, for example within boundaries which the skilled person will understand as being acceptable for achieving a meaningful output signal as described herein.

Similarly, a phase difference of precisely 180° is not essential, and the phases may differ by other amounts in the region of 180°. Accordingly, the phases of the two voltages may be considered to be "opposite", where this is intended to include arrangements in which the phase difference is close to or approximately, substantially or nominally 180° ($\pi$ radians), within boundaries which the skilled person will understand as being acceptable for achieving a meaningful output signal as described herein.

In this example, the signal electrodes are driven at specified voltages from voltage sources, so might be considered to be voltage electrodes. In other examples, the signal electrodes may be driven at specified currents from current sources. Accordingly, the term "signal electrode" is intended to include both alternatives, such that these electrodes provide electrical signals with a frequency, magnitude and phase difference as described and which may be a voltage signal or a current signal. In any of the various examples, voltage sources and voltage electrodes may be substituted with current sources and current electrodes, or vice versa. Similarly, the application of a voltage may more generally be understood as the application of an "electrical signal", which may be a voltage or a current depending on the choice of electrical source.

The measurement electrodes are configured with circuitry that produces a differential signal indicating the difference between measurements from the first electrode group 50 and the second electrode group 52. As shown in FIG. 4, this is implemented in the present example by summing or combining the current I3 detected in the first current path (by the first measurement electrode 62a) with the current I4 detected in the second current path (by the second measurement electrode 66a), to produce a summed signal I5. This first summed signal I5, from the first electrode group, is passed to a current-to-voltage converter 34a. Similarly, the current I6 detected in the further first current path (by the further first measurement electrode 62b) is summed or combined with the current I7 detected in the further second current path (by the further second measurement electrode 66b) to produce a summed signal I8. This second summed signal I8, from the second electrode group, is passed to another current-to-voltage converter 34b. Note that in an alternative arrangement, the circuitry could be configured to implement the current-to-voltage conversions before the summing or combining. In either case, the first summed signal I5, representing the sum of current flow in the first and second current paths of the first electrode group 50, and the second summed signal I8, representing the sum of current flow in the first and second current paths of the second electrode group 52, are passed to further circuitry configured to determine a differential signal that represents the difference between the first summed signal and the second summed signal. In the FIG. 4 example, this comprises a differential amplifier 36. Then, the differential signal can be processed using appropriate processing circuitry or electronics, to calculate from the differential signal an impedance signal indicating the impedance properties or characteristics of the sample fluid, which necessarily includes the impedance properties or characteristics of any particles in the sample fluid. From this, any effect of antibiotics on bacteria in the sample fluid can be identified by comparison with measurements of impedance from samples of the same bacteria untreated with antibiotics, or treated with different types or amounts of antibiotics.

Figure 5:
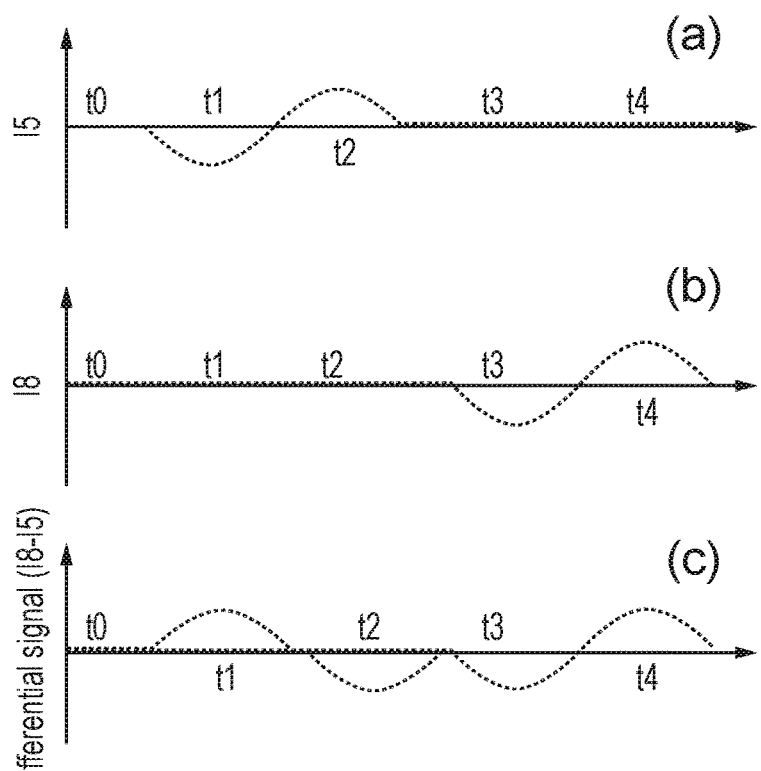
FIG. 5 (a) to (c) shows graphs of summed current against time and differential summed current against time measured with the apparatus of FIG. 4.

Derivation of the differential signal can be understood from FIG. 5, which shows graphs of current against time for the two summed signals (a) and (b), and the corresponding differential signal (c).

FIG. 4 shows a particle 42, such as a bacteria, in the flow channel 12 at a position in which it is upstream of the first electrode group 50, and about to enter a measurement region defined by the electrodes. By time t5, the particle 42 has passed all the electrodes and exited the measurement region. The graphs in FIG. 5 show the various signals at t0 and subsequent times t1 to t4 before t5. For convenience and simplicity, the fluid sample may have a cell concentration and a flow speed along the fluid channel that is intended to provide only one particle at a time in the measurement region, being the zone within which the electric fields of the electrodes are present.

At t0, the particle 42 is outside the measurement region, and does not interact with any of the current paths. Hence, in the first electrode group 50, the first measurement electrode 62a detects a current I3 in the first current path which is the same magnitude but opposite phase to the current I4 in the second current path detected by the second measurement electrode 66a. Therefore, I3 and I4 cancel one another out, and their sum is zero (or approximately zero, given any minor differences in the electrical signals delivered by the signal electrodes), giving a first summed signal I5 of zero at to, as in FIG. 5(a). Similarly, in the second electrode group 52 the current I6 at the further first measurement electrode 62b is equal but opposite to the current I7 at the further second measurement electrode 66b, so that their sum is also approximately zero, giving a second summed signal I8 of zero, shown in FIG. 5(b). Therefore, at t0, the differential signal I8−I5 is also zero, as shown in FIG. 5(c). Hence, the "background" signal measured by the apparatus, when no particle is present, is substantially zero-valued and obtained from the difference of two zero-valued measurements. Accordingly, the voltages applied at the voltage electrodes can be raised to a high value without the detected signals undergoing any clipping in the converters 34 or the differential amplifier 36, so the measurement sensitivity can be maximised within the capability of the voltage sources.

At time t1, the particle is between the first signal electrode 60a and the first measurement electrode 62a, so impedes the current flow in the first current path. I3 is therefore reduced. The current flow I4 in the second current path, between the second signal electrode 64a and the second measurement electrode 66a, remains as before. The first summed signal I5, being I3+I4, is therefore also reduced. The second summed signal I8, being I6+I7 from the second electrode group, remains at approximately zero, since no particle is in either of these current paths. The differential signal I8−I5 therefore becomes positive, owing to the reduced value of I5. At t2, the particle 42 has moved to be between the second signal electrode 64a and the second measurement electrode 66a. The current I3 in the first current path resumes its previous value, and the current I4 in the second current path is reduced, by the presence of the particle 42. Recall that the second signal electrode has a negative driving voltage, however, so that the first summed signal I5=I3+I4 becomes positive, as shown in FIG. 5(a). The second summed signal I8 remains at approximately zero. Accordingly, the differential signal I8−I5 becomes negative at t2.

At time t3 and then later at time t4, the particle enters the second electrode group 52, and interacts with the further first current path I6 at t3, and then the further second current path I7 at t4. Since the further first current path I6 has the same voltage supply as the first current path I2, and the further second current path I7 has the same voltage supply as the second current path I4, the second summed signal follows the same shape at times t3 and t4 as the first summed signal showed at times t1 and t2, becoming negative in t3 and positive in t4. Meanwhile, the first summed signal I5 remains zero during these times since no particle is present in the part of the measurement region corresponding to the first electrode group. Hence, in t3, the differential signal I8−I5 goes negative, and then becomes positive in t4, as shown in FIG. 5(c).

At t5, the particle has left the measurement region, so all four current paths are unperturbed. Both summed signals will be substantially zero, giving a zero-valued differential signal, as at time to.

Note the particular shape of the curve followed by the differential signal, shown in FIG. 5(c). The sequential arrangement along the channel length of the two electrode groups 50, 52 and the four pairs of electrodes with the groups, together with the alternating arrangement of positive and negative voltages for the signal electrodes along the channel length, gives a corresponding differential signal that shows positive then negative then negative than positive features over time, as a particle passes along the measurement region. This shape is more distinct compared to noise than the differential signal from the FIG. 1 apparatus, so can be more readily distinguished (using signal processing techniques). This enhances the signal to noise ratio, further improving the sensitivity.

The differential signal may alternatively be calculated as I5−I8, if preferred, i.e. the first summed signal minus the second summed signal. In either case, differential signal represents the difference between the summed signals. This is also applicable to examples described further below.

This electrode configuration (and similar configurations enabling the same result) and its improved performance enables meaningful impedance measurements to be obtained for small particles such as bacteria flowing in a large channel. This reduces the risk of blockages of the channel, and makes such an apparatus more usable in real-world environments and situations. Bacterial cells typically range in size from 0.2 to 2 μm. By "a large channel", it is meant that the dimensions of the channel in the plane transverse to the fluid flow direction are in the range of about 10 to 50 μm, such as 20 μm. As an example, the channel may have a square cross-section (arising for example from the layered construction and formation with photolithography) with a substantially equal width and height of about 40 μm. Alternatively, the channel may have a height, being a dimension orthogonal to a plane of the substrate on which the apparatus is formed and to the direction of flow, and parallel to the current flow path from a voltage electrode to a measurement electrode, of about 10 to 50 μm, such as about 20 μm, with the transverse (width) dimension, being larger. Other dimensions may also be used, such as a channel with a smaller dimension in the range of 100 to 1000 μm suitable for measuring cells about 10 μm across, or still larger channels able to accommodate particles on the millimetre scale.

Other electrode configurations may be used to obtain the same or similar signals from which impedance characteristics of particles in the sample fluid may be deduced. A variety of arrangements comprising a first electrode group and a second electrode group each providing a first current path and a second current path driven at approximately equal but approximately opposite voltages is possible. Within a group, the first current path and the second current path may be at different locations along the flow direction of the channel, as in FIG. 4. The first electrode group and the second electrode group may also be at different locations along the flow direction of the channel, also as in FIG. 4. The electrodes of each group need not be physically grouped together, however, and may be dispersed among electrodes of the other group.

Figure 6:
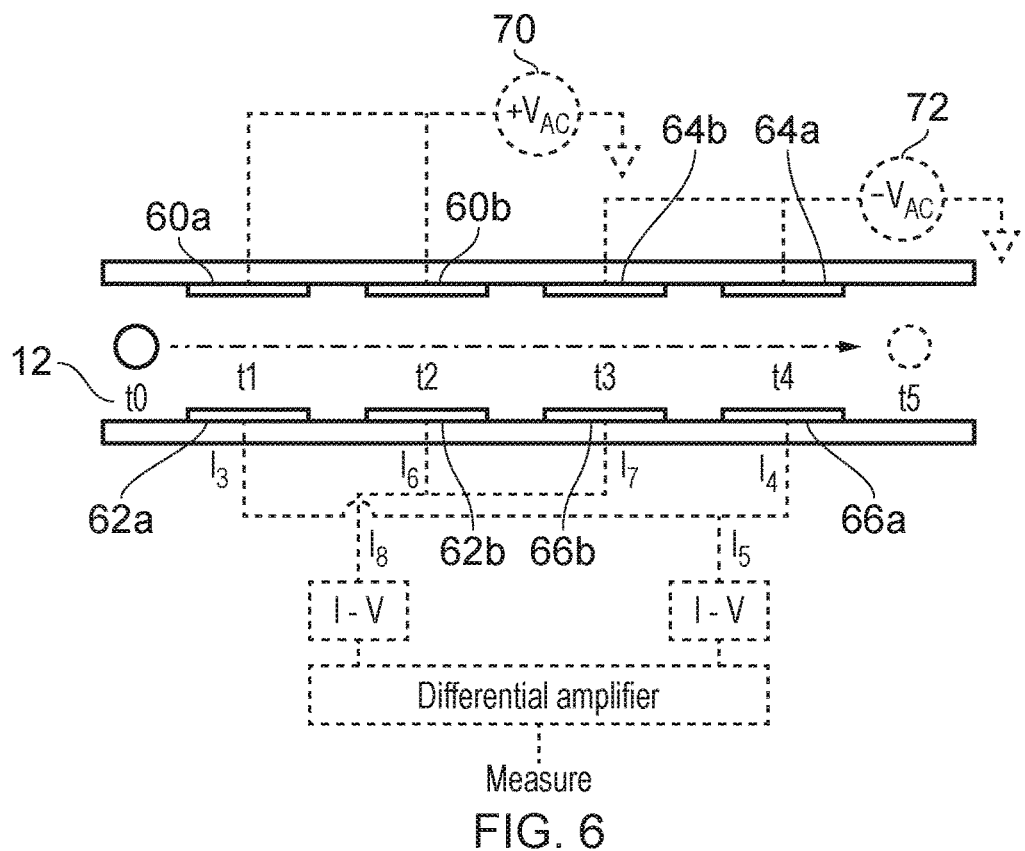
FIG. 6 shows a schematic cross-sectional side view of an electrode and circuitry configuration for an impedance flow cytometer according to a second example.

FIG. 6 shows a second example, in a schematic cross-sectional side view including the same elements as FIG. 4. Hence, eight electrodes are included, comprising four signal electrodes and four measurement electrodes disposed as four pairs across the flow channel 12. However, in this example, the signal electrodes of each electrode group are alternated along the flow channel. Thus, in order along the flow channel 12, the measurement region comprises firstly the first signal electrode 60a and its first measurement electrode 62a to give the first current path I3, secondly the further first signal electrode 60b and its further first measurement electrode 62b to give the further first current path I6, thirdly the further second signal electrode 64b and its further second measurement electrode 66b to give the further second current path I7, and lastly the second signal electrode 64a and its second measurement electrode 66a to give the second current path I4. The first current path I3 and the second current path I4 are combined for the first summed signal I5, and the further first current path I6 and the further second current path I7 are combined for the second summed signal I8, as before. The time evolution of the differential signal for a particle traversing the measurement region will be differently shaped from that shown in FIG. 5(c)—it will comprise positive then negative then positive than negative features— but can be distinguished from noise by appropriate filtering and/or signal processing.

The examples of FIGS. 4 and 6 both comprise separate voltage sources (or current sources) to supply the first electrical signal to the first signal electrodes in each group and the opposite second electrical signal to the second signal electrodes in each group. The signal electrodes are connected to one side of the voltage source, and the other side is connected to ground.

Figure 7:
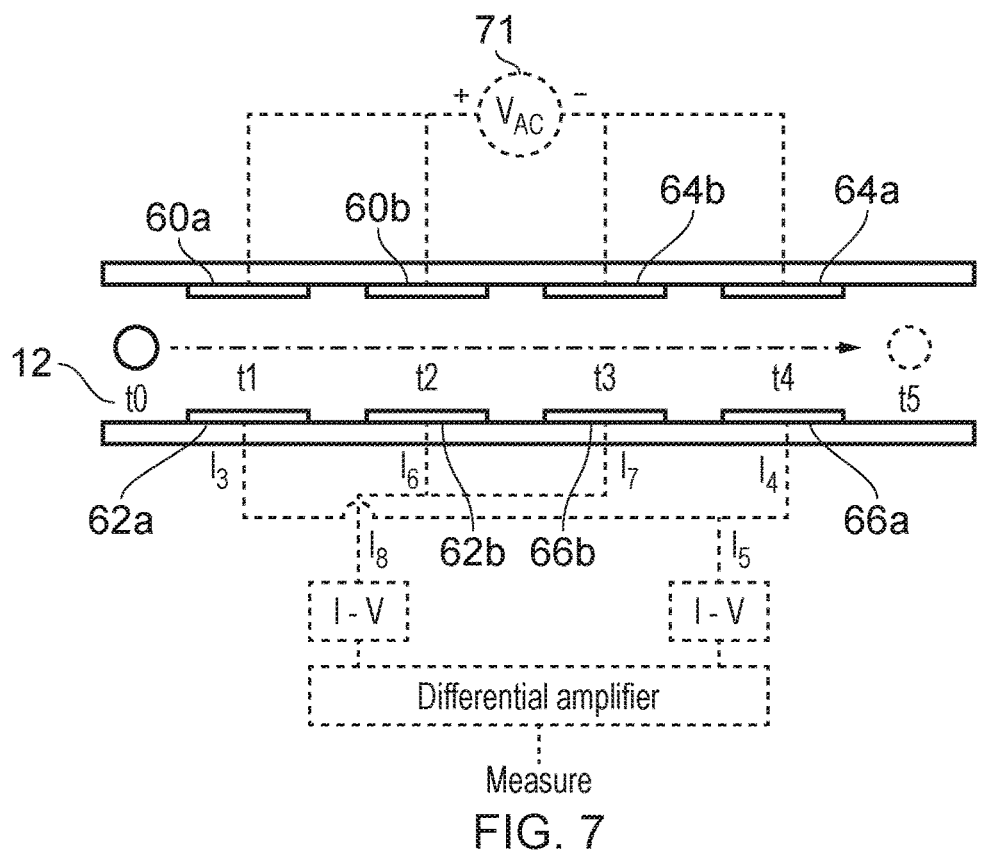
FIG. 7 shows a schematic cross-sectional side view of an electrode and circuitry configuration for an impedance flow cytometer according to a third example.

FIG. 7 shows a schematic cross-sectional side view of an alternative example that is simplified by use of a single voltage source to drive all the signal electrodes. This example comprises eight electrodes, positioned the same as in the FIG. 6 example. A single voltage source 71 drives all the signal electrodes. The first signal electrodes 60a, 60b of each electrode group are connected to the positive side of the voltage source 71 to receive +V, and the second signal electrodes 64a, 64b of each electrode group are connected to the negative side of the voltage source 71 to receive −V.

FIG. 8 shows highly simplified representations of the electrode configurations of several further examples. In each case, the central elongate block represents the flow channel, and the electrodes are indicated in various paired positions on opposite sides of the channel. Typically the electrodes will be above and below the flow channel owing to the constraints of conventional fabrication of a layered microfluidic structure, but this is not essential for operation, and the apparatus may be configured with electrodes disposed about the channel in other orientations. Signal electrodes are indicated with a "V" label, with those voltage electrodes receiving a positive electrical signal (described thus far as the first signal electrode of each electrode group) designated as "+V", and those signal electrodes receiving a negative electrical signal (described thus far as the second signal electrode of each electrode group) designated as "−V". Measurement electrodes are indicated with a "M" label. Those measurement electrodes belonging to the first electrode group and whose current outputs are combined as the first summed signal are designated as "M1", and those measurement electrodes belonging to the second electrode group and whose current outputs are combined as the second summed signal are designated as "M2". Note therefore that the "1" and "2" labels refer to the first and second electrode groups, and not to the measurement electrodes of the first and second current paths within an electrode group.

FIG. 8(a) shows an arrangement similar to the FIG. 6 example, with the positive and negative signal electrodes placed adjacently, but in this case the measurement electrodes of the first group are placed as the two central measurement electrodes and the measurement electrodes of the second group are the two outer measurement electrodes, opposite to the FIG. 6 arrangement.

The examples so far have all comprised signal electrodes at the top of the flow channel and measurement electrodes at the bottom of the channel. This is not a limitation, however, and any of the electrodes may be placed in either position, perhaps according to convenience in connecting them with the voltage or current source(s) (electrical signal sources) and the measurement circuitry. FIG. 8(b) shows an example with the electrode pairs for each current path arranged along the flow channel in the same order as in FIG. 8(a), but with the electrodes of the second pair (comprising the first signal electrode and the first measurement electrode, in the first electrode group) oppositely arranged so that the measurement electrode is above the channel and the signal electrode is below the channel. Any or all of the other electrode pairs may be similarly inverted.

Further, the individual electrodes may be combined in larger electrodes that perform the function of two individual electrodes, for example where those electrodes are physically adjacent. FIG. 8(c) shows an example in which the electrodes are arranged substantially as in the FIG. 4 example, in that the electrodes of the first electrode group are physically distinct from the electrodes of second electrode group. This requires that the first measurement electrode and the second measurement electrode, in the first electrode group, are adjacent, and the further first measurement electrode and the further second measurement electrode, in the second electrode group, are adjacent, and downstream from the first and second measurement electrodes. This allows the first and second measurement electrodes to be replaced with a single combined electrode M1. This electrode collects the current from both the first current path (from +V) and the second current path (from −V), so that its output is already a combined or summed signal from the first electrode group. Similarly, the further first measurement electrode and the further second measurement electrode are replaced by a single combined electrode M2, that outputs the summed signal representing the first and second current paths of the second electrode group.

FIG. 8(d) shows a similar arrangement to the FIG. 8(c) example, except that the electrodes of the first electrode group (a +V signal electrode, a −V signal electrode, and a single measurement electrode M1) have been reversed in position so that the measurement electrode is on the upper surface of the channel and the signal electrodes are on the lower surface of the channel.

FIG. 8(e) shows an example demonstrating that signal electrodes may also be combined into a single larger electrode. Within an electrode group as described thus far, the signal electrodes comprise two electrodes that apply different, opposite electrical signals (voltage or current) to the two current paths of that group. Therefore, the signal electrodes within a group cannot be combined. However, the same voltages or currents (nominally) are applied to corresponding positive and negative signal electrodes in the two different electrode groups, giving scope for signal electrodes to be combined or shared across the electrode groups. In the FIG. 8(e) configuration, the measurement electrodes within each electrode group are combined as in the FIG. 8(c) example, to give a single M1 electrode and a single M2 electrode, placed on the same (lower) side of the channel. The signal electrodes are above the channel, and arranged also as in the FIG. 8(c) example, except that the two −V signal electrodes, adjacent in the centre of the signal electrode array, are combined as a single electrode which is placed so as to be shared by both measurement electrodes. In other words, the field from this signal electrode gives a current path to the M1 electrode and a current path to the M2 electrode; these are the second current paths for the two electrode groups. In an alternative, the +V and −V electrodes could be switched around, so that the central shared electrode is the +V electrode, flanked by two −V electrodes.

Thus far, the examples have all comprised electrodes paired to provide current paths that pass through the fluid channel in a direction roughly transverse to the fluid flow direction; this is achieved by the paired electrodes being disposed on opposite sides of the channel. This is not essential however, and the current paths may be otherwise situated, in any arrangement that allows suspended particles to interact with the electric fields emanating from the voltage electrodes and hence modify the current flow in the current paths.

FIG. 8(f) shows such an example. The electrodes are arranged so that signal electrodes and measurement electrodes alternate along the upper and lower sides of the channel, but are arranged opposite to a same type of electrode. Hence, the signal electrodes producing the same electrical signal are opposite to one another, and the electric fields are directed along the direction of the channel length to the adjacent measurement electrodes. In this example, the central signal electrodes are shared by both electrode groups, and provide current paths to both the adjacent M1 electrodes and the adjacent M2 electrodes. As shown, the central signal electrodes are the −V electrodes, while the +V electrodes are placed in the outer positions. This arrangement might be reversed, however, and similarly the signal electrodes and the measurement electrodes may have their positions switched. These arrangements provide current paths (indicated as lines in FIG. 8(f)) which are substantially along, or parallel to, the fluid flow direction through the channel.

The electrodes may be planar, which is convenient in a chip-based device fabricated in layers, but this is not essential. For example, the electrodes may be formed as rings or collars sequentially surrounding the channel, which might be of circular or oval cross-section, formed from a pipe or tube, for example. Each ring combines the two individual opposite electrodes in the FIG. 8(f) example.

In further examples, the number of electrodes may be increased, to provide additional current paths. This will increase the distinctive nature of the pattern of the differential signal, making it easier to isolate from noise and hence improving the sensitivity. The number of electrode groups is maintained as two, and within each group, extra electrodes provide additional first and second current paths. The particle impedance signal can be extracted from height-related features of peaks and troughs in the summed signal and/or the differential signal. This can be accomplished by measuring the amplitude of the peaks and/or troughs, or matching the shape of the signal to templates obtained for particles with known characteristics, for example. FIG. 8(g) shows an example comprising sixteen electrodes, arranged in pairs on opposite sides of the channel to define eight current paths. Each of the first and second electrode groups comprises eight electrodes defining four current paths. There are two first current paths (+V to M1) and two second current paths (−V to M1) for the first electrode group. The current flow detected at all four M1 electrodes is combined or summed to obtain the first summed signal. Similarly, there are two further first current paths (+V to M2) and two further second current paths (−V to M2) for the second electrode group, where the current flow detected at all four M2 electrodes is combined or summed to obtain the second summed signal. Then, as before, the differential signal is determined to indicate the difference between the first summed signal and the second summed signal. The sequence of the peaks and troughs in the summed signals and/or the final differential signal can be designed by choosing the relative sequence of the signal electrodes (providing +V and −V) and the measurement electrodes (M1 and M2). In the FIG. 8(g) example the overall differential signal obtained as a particle passes along the channel gives the peaks and troughs shown in FIG. 8(h). FIG. 8(i) shows a further example electrode configuration with sixteen electrodes defining eight current paths. The electrodes are differently arranged than in the FIG. 8(g) example, and produce a differential signal as shown in FIG. 8(j). As can be seen, the pattern of peaks and troughs differs from that in FIG. 8(h). It is known from signal processing mathematics that the signal shape in FIG. 8(j) is more unique than that in FIG. 8(h), so that an improved signal to noise ratio can be obtained from apparatus configured as in FIG. 8(i).

As discussed, the impedance flow cytometry apparatus of the present disclosure is particularly applicable to measurements of bacteria samples, which are difficult to measure with conventional impedance flow cytometry apparatus owing to their small size. Thus, the present apparatus has application for improved diagnosis of bacterial infection and prescription of antibiotics. However, because the flow channel of the apparatus is able to have significantly larger dimensions than typical bacterial cell sizes, the apparatus is also useful for measurements of samples of non-bacterial cells, which typically have a larger size than bacterial cells, and indeed for particles of non-biological origin. The differential signal generated by the apparatus has a distinctive shape (the exact details of which depend on the ordering of the various electrodes), so at a simple level, the apparatus may be used for particle or cell counting. The processing of the differential signal may comprise a simple identification and count of all occurrences of the particular shape of the signal that arises from the passage of a particle through the measurement region. This can be used for counting of regular cells, but is also applicable to identification of biological susceptibility to antibiotics. Some antibiotics act by destroying the bacterial cells, so that if a strain of bacteria is susceptible to an antibiotic of this type, exposure of the bacteria sample to the antibiotic will reduce the population of bacterial cells in the sample. This can be identified by counting cells in a sample of treated bacteria and comparing it to the cell count of a sample of untreated bacteria. Simple analysis of this type may not require any detailed calculation or analysis of the actual values of impedance of particles in the fluid sample; there may not be a need to derive an impedance signal from the differential signal, or to identify impedance values, properties or characteristics of the particles from the impedance signal.

However, analysis of the impedance signal can reveal additional valuable information about cells, and bacterial susceptibility to antibiotics in particular.

Different classes of antibiotics have different modes of operation, and produce different biophysical changes in the bacterial cells. As noted above, some antibiotics destroy bacterial cells, thereby reducing the cell population size, which can be detected via a cell count. Other antibiotics operate by inhibiting cell wall synthesis, which can produce an overall increase in cell volume (size). The cell wall properties themselves may be altered, such as a change in thickness, electrical or material properties, or porosity, and the internal cell structure or composition may change. These various characteristics—cell size, cell wall properties, internal properties—all contribute to the impedance properties or value of the cell. Accordingly, measurement of the impedance of particles in a sample can reveal characteristics of the cells. Comparison between measurements of samples treated and untreated with antibiotics can reveal if the characteristics have been changed by the antibiotic exposure, indicating a susceptibility to the antibiotic.

On a simple level, the magnitude of the differential signal obtained by the present apparatus, an example of which is shown in FIG. 5(c), has a dependence on particle size. A larger particle has a greater effect on or interaction with the electric field in the flow channel, so the current flow is reduced more, and a lower current is detected at the measurement electrode. The differential signal will therefore contain peaks and troughs of a larger amplitude than for a smaller particle. Comparison of a measurement from an exposed bacteria with that from an unexposed bacteria may therefore reveal antibiotic susceptibility if the differential signal from the former measurement shows larger amplitude features than the latter sample. One may consider the differential signal directly for this analysis, or calculate corresponding impedance values from the differential signal.

When considering impedance values, recall that impedance comprises two parts, the real part and the imaginary part, or more usefully, the magnitude $|Z|$ and the phase. Any value or combination of these parts may be analysed to investigate properties of particles in a sample fluid. Moreover, the nature of the interaction of a particle with the electric field depends on the frequency of the electric field. Hence, different impedance results can be obtained by measuring at different frequencies or more than one frequency, and these can reveal different characteristics of the particle. The measurement might be done by studying one sample of a bacteria at one frequency and studying another sample of the same bacteria at a second frequency, by connecting a different voltage or current source to the signal electrodes or setting the signal source to output a different frequency to the signal electrodes. More conveniently, however, the signal source or sources used to drive the signal electrodes can be configured to output more than one frequency at the same time. Appropriate filtering and/or processing of the differential signal or the impedance signal derived from it can be carried out to isolate the different frequency components in the recorded measurements.

FIG. 9 shows representations of the interaction of a particle (cell) with electric fields of different frequencies. A cell 42 suspended in an electrolytic fluid is in an electric field (indicated by the lines), such as would be present in the flow channel between a signal electrode and a measurement electrode. In FIG. 9(a), the frequency is low, by which is meant a frequency in the range of about 10 MHz or less, such as about 1 MHz or about 5 MHz. In this regime, the electric field passes around the cell 42 (note that the electric field lines do not penetrate into the cell and are diverted around it), and the measured impedance signal reflects the electric volume of the cell (representative of the cell's physical size). Accordingly, the cube root of the measured impedance magnitude, $|Z|^{1/3}$, approximately reflects the electric radius. In FIG. 9(b), the frequency is high, by which is meant a frequency greater than the low frequency, for example a frequency which is greater than about 10 MHz, such as about 40 MHz. In this regime, the electric field capacitively couples across the wall (membrane) of the cell 42 (note that the electric field lines pass through the cell relatively unperturbed). The effect of this is that the measured impedance signal reflects the electrical properties of the cell wall and/or membrane and/or the cytoplasmic properties of the cell's interior. This can be termed the "electric opacity". Accordingly, differences in these characteristics between two cells will be apparent as differences between the measured impedances at a high frequency. Note that useful values for high and low frequencies will be different, or significantly different, from these example values for other cell types, other particle types, and/or different conductivities of the suspending electrolyte. For example, values for a high frequency of about 1 MHz for non-bacterial cells and about 10 MHz for bacterial cells in a suspending medium with a conductivity similar to physiological media might be suitable. A low frequency is one at which the electric field generally does not penetrate the particle, and from which size information about the particle can be deduced. A high frequency is one at which the electric field couples across the cell wall, allowing properties dependent on the cell's membrane and wall to be investigated. At much higher frequencies (about 5 MHz or above for non-bacterial cells and about 50 MHz or above for bacteria, considered to be within a high frequency regime for the present disclosure), internal structure and component parts can be measured.

Hence, there is a distinction between measurements at different frequencies (particularly between low frequencies and high frequencies as defined above) of the same particle that depend on properties of that particle, from which information about those properties can be deduced. Other parameters also affect the distinction, including the conductivity and permittivity of the suspending electrolyte fluid, but this and other parameters which are features of the apparatus and the testing regime or protocol can be kept constant across multiple measurements so do not impact on comparative analyses.

Measurements may be obtained at a single frequency only, which may be high or low, or at more than one frequency, typically two, either sequentially or simultaneously.

An approach for two frequencies is, for an individual particle, to calculate the impedance (magnitude, phase, real or imaginary components) at the low frequency, and the impedance at the high frequency. These values are plotted on a graph, together with the values for other particles in the same sample, to produce a scatter plot. The low frequency impedance magnitude, indicating the electric radius or electric volume, may be plotted on the x-axis of the graph, and the high frequency impedance magnitude may be plotted on the y-axis of the graph. Alternatively, the y-axis may plot the ratio of the high frequency value to the low frequency value, thereby normalising the opacity to the cell size; this is termed "electrical opacity".

Figure 10:
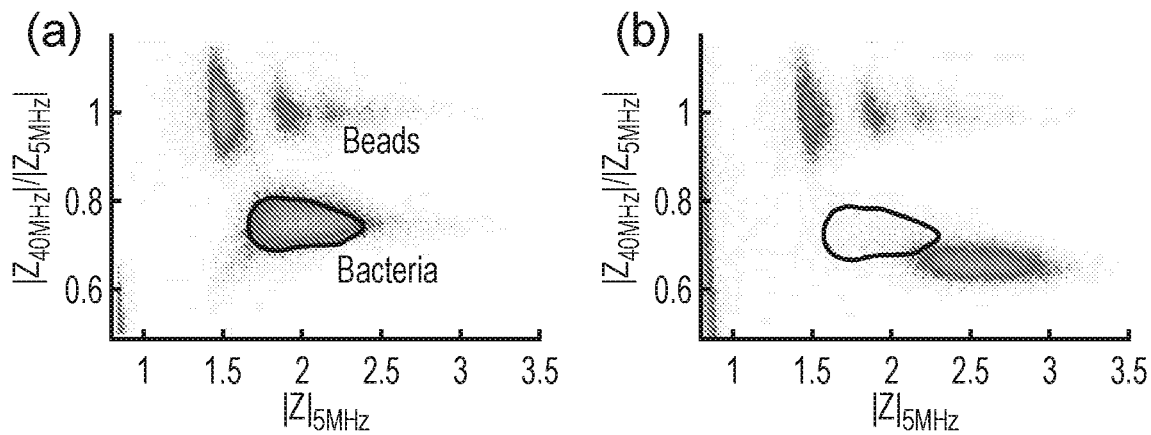
FIGS. 10 (a) and (b) show example scatter plots of impedance data recorded from bacterial cell samples at two frequencies with an impedance flow cytometer according to an example of the present disclosure.

FIG. 10 shows two example scatter plots. FIG. 10(a) shows measurements for a bacterial strain that has not been treated with any antibiotic. The measurements were obtained at two frequencies, a low frequency of 5 MHz and a high frequency of 40 MHz. The impedance value for each cell at the low frequency, $|Z|_{5MHz}$, is plotted on the x-axis, and the normalised impedance value for each cell at the high frequency, $|Z|_{40MHz}/|Z|_{5MHz}$, is plotted on the y-axis. Each data point corresponds to an individual particle in the sample. For calibration/reference purposes, the sample included a quantity of plastic micro-beads. These appear on the graph centred around a high frequency value of 1, well-separated from the points representing the bacterial cells in the sample. These are centred on a high frequency value of about 0.75, extending over a low frequency range of about 1.6 to 2.4. A closed solid line is superimposed over the bacteria data points to indicate the location of the bulk of the bacterial population.

FIG. 10(b) shows measurements for a sample of the same bacterial strain which has been incubated with an antibiotic for 30 minutes. The data points for the beads are unchanged from FIG. 10(a). The data for the bacteria, however, has shifted significantly to higher impedance values at the low frequency, now occupying a range of about 2.1 to 3, and shifted somewhat to lower impedance values at the high frequency, now centred at about 0.7. The solid line from FIG. 10(a) is reproduced in FIG. 10(b). Almost no data points lie within the solid line, indicating that virtually the entire population of bacteria has been substantially modified by the antibiotic. The shift to larger low frequency values indicates an increased electric radius, and the shift to smaller high frequency values indicates a change in the internal cell structure and/or the cell wall. Accordingly, we deduce that the antibiotic has had a measurable effect on the bacteria, so the bacteria are susceptible to that particular antibiotic.

Results may also be obtained by measuring at one frequency only. A scatter plot for a bacterial population may then be produced by plotting the impedance magnitude against the impedance phase.

Figure 11:
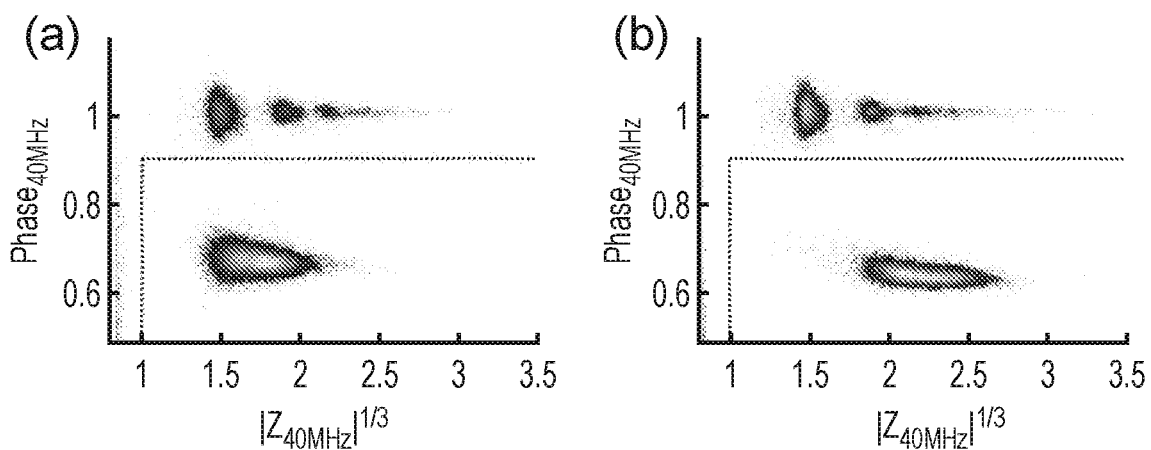
FIGS. 11 (a) and (b) show example scatter plots of impedance magnitude and phase data recorded from bacterial cell samples at one frequency with an impedance flow cytometer according to an example of the present disclosure.

FIG. 11 shows two further example scatter plots, of data obtained at a high frequency of 40 MHz only. The x-axis of each graph plots the electric radius (cube root of the impedance magnitude) measured at 40 MHz. The y-axis of each graph plots the phase of the impedance signal measured at 40 MHz. As before, plastic microbeads were included in the samples; these appear at a phase value of about 1. Data points at lower phase values, around 0.7, indicate bacteria; hence phase measurements can readily distinguish between bacteria and beads. FIG. 11(a) shows a plot for a sample of bacteria that has not been treated with antibiotic. The measured electric radii for the population range from about 1.5 to 2.1. FIG. 11(b) shows a plot for a sample of the same bacteria that have been exposed to antibiotic. The bacteria population has shifted to higher x-axis values, covering a range from about 1.8 to 2.7. Since it is known that exposure to an effective antibiotic can increase bacterial cell size, we deduce that the bacterial strain is susceptible to the antibiotic that has been applied.

Figure 12:
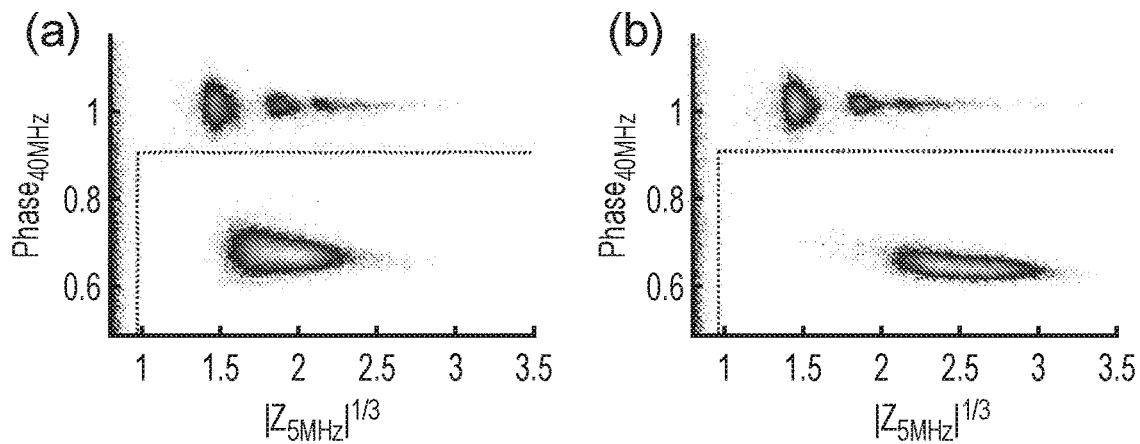
FIGS. 12 (a) and (b) show example scatter plots of impedance magnitude and phase data recorded from bacterial cell samples at two frequencies with an impedance flow cytometer according to an example of the present disclosure.

As a further alternative, phase and magnitude values at different frequencies may be combined. FIG. 12 shows further example scatter plots for data obtained at 5 MHz and 40 MHz. As for the FIG. 11 graphs, the FIG. 12 graphs plot the phase at 40 MHz on the y-axis. The x-axis, however, shows the electric radius at the low frequency, 5 MHz. FIG. 12(a) shows measurements from a sample of bacteria untreated with antibiotic, and FIG. 12(b) shows measurements from a sample of the same bacteria that has been treated with antibiotic to which the bacteria are susceptible. The bacteria and antibiotic are the same as for the FIG. 11 data. Both samples contained reference beads, having a phase value around 1. As with the FIG. 11 data, the bacteria are easily distinguished from the beads, having a lower phase value around 0.7. Note that the phase values are the same as in FIG. 11, since the phase data is obtained for the same, high, frequency. Again as before, the treated bacteria show a shift to larger values of electric radius, arising from the susceptibility to the antibiotic causing an increase in cell size. Note that in this example, the apparent increase in cell size is greater than in FIG. 11, to values in the range of about 2.1 to 3. This is owing to the greater sensitivity of cell size to low frequency measurements than high frequency measurements.

From these results, it may be appreciated that an apparatus according to the present disclosure may be configured to apply electric signals (voltages or currents) to the first and second signal electrodes at one frequency, or at more than one frequency. Accordingly, the apparatus may comprise one or more electrical signal sources operable to generate one frequency, or two or more frequencies. The one frequency may a high frequency, or a low frequency. The two or more frequencies may comprise two frequencies, one high and one low. A high frequency may be in range of about 10 MHz or above, such as between 10 and 1000 MHz, for example 40 MHz. In some applications, even larger frequencies may be useful, such as frequencies up to about 10 GHz. The low frequency is smaller than the high frequency and may be in the range of 10 MHz or below, such as between 1 and 10 MHz, for example 5 MHz. Other and/or additional frequencies are not precluded, however, and can be chosen with reference to a particular application. Similarly, the ratio between the low frequency and the high frequency can vary greatly depending on the application.

As described, an apparatus according to the present disclosure may be designed in a so-called "lab-on-a-chip" format, comprising a series of patterned layers of different materials laid down on a supporting layer or substrate. The flow channel may be formed within an intermediate layer or layers by a patterning procedure such as photolithography. The electrodes may also be deposited as layers above and below the channel. Any conductive material could be used for the electrodes; suitable conductive materials include platinum, gold, indium tin oxide, iridium oxide and titanium nitride, although other materials are not excluded. Conductive elements that enable electrical connection of the signal electrodes to one or more voltage or current sources and of the measurement electrodes to the measurement circuitry may also be formed as layers within the structure, or as conductive vias passing through the layers.

Fabrication in a chip format enables the apparatus to be readily extended to include two or more fluid flow channels, each with its own associated electrodes. Alternatively, the signal electrodes and/or the measurement electrodes could be shared by more than one channel. A single processor or similar processing electronics or circuitry can be used to handle all the differential signals, however. An apparatus configured in this way enables simultaneous measurements to be obtained simply for multiple samples. In the context of bacterial testing, this can allow the reference sample of untreated bacteria to be measured at the same time as the treated sample, or multiple samples of a particular bacteria to be tested with different antibiotics, or multiple samples of a particular bacteria to be tested with different concentrations of the same antibiotic to determine the so-called minimum inhibitory concentration, or to carry out so-called breakpoint analysis in which bacteria are assessed against one or two concentrations of antibiotic pre-defined by standards institutes in order to determine susceptibility or resistance.

Figure 13:
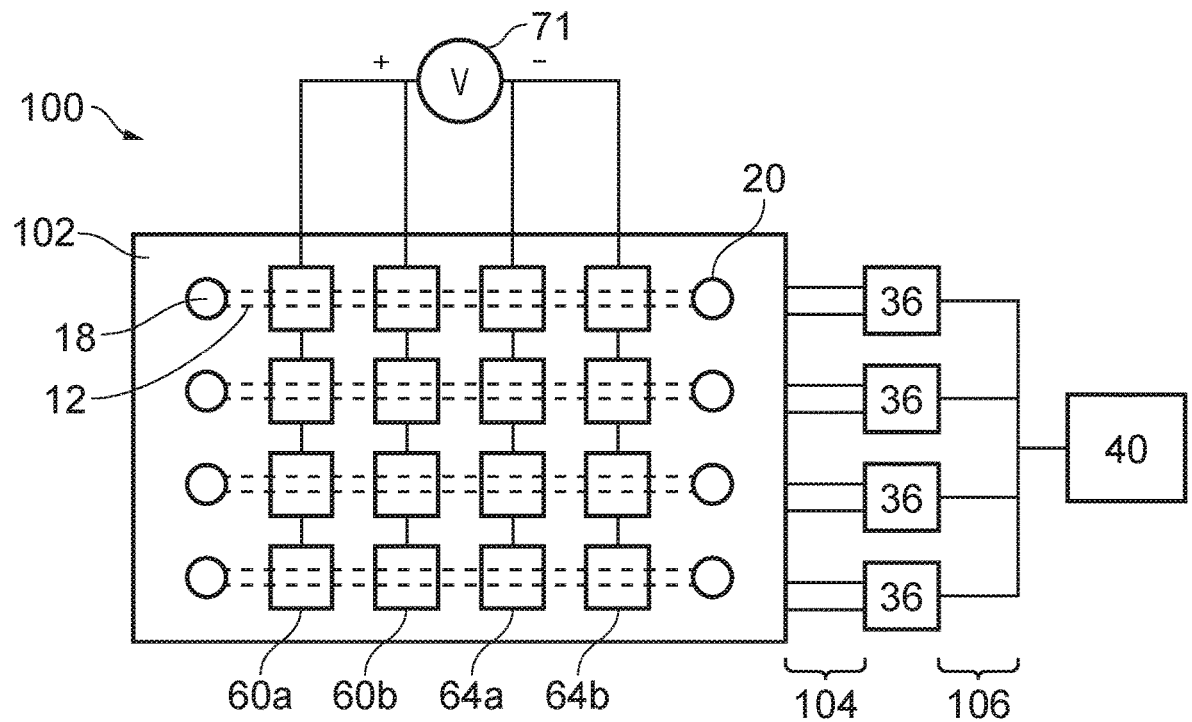
FIG. 13 shows a schematic plan view of an example of an impedance flow cytometer according to an example of present disclosure, comprising multiple measurement flow channels.

FIG. 13 shows a simplified plan view of an example apparatus configured for testing of multiple samples, simultaneously if desired. The apparatus 100 comprises a chip 102 with a layered structure, in which is defined four microfluidic channels 12, each with an inlet 18 and outlet 20 formed in an upper surface of the chip 102. Each channel 12 has four associated signal electrodes at an upper side of the channel. A single voltage source 71 can provide driving voltages for all the signal electrodes. Hence, a positive side of the voltage source 71 is connected to a first signal electrode 60a and a further first signal electrode 60b for each channel, and negative side of the voltage source 71 is connected to a second signal electrode 64a and a further second signal electrode 64b for each channel. Alternatively, one or more current sources could be used to drive the signal electrodes. The signal electrodes provide current paths through the channels to measurement electrodes (not shown), where current measured in the current paths is combined in circuitry (not shown) to produce for each channel a first summed signal and a second summed signal 104. The summed signals 104 for each channel are input to one of four differential amplifiers 36, one for each channel, to obtain a differential signal 106 for each channel. The differential signals 106 are input to a processor 40 configured to process the differential signals for the purpose of determining impedance signals, impedance values, impedance properties and characteristics of fluid and/or cells, and/or cell counts, as described herein. The circuitry and processing can be implemented with any suitable configuration or combination of hardware, firmware and software, including simple electrical connections, logic gates, amplifiers and central processing units. Moreover, the apparatus may be differently configured from the example of FIG. 13.

Figure 14:
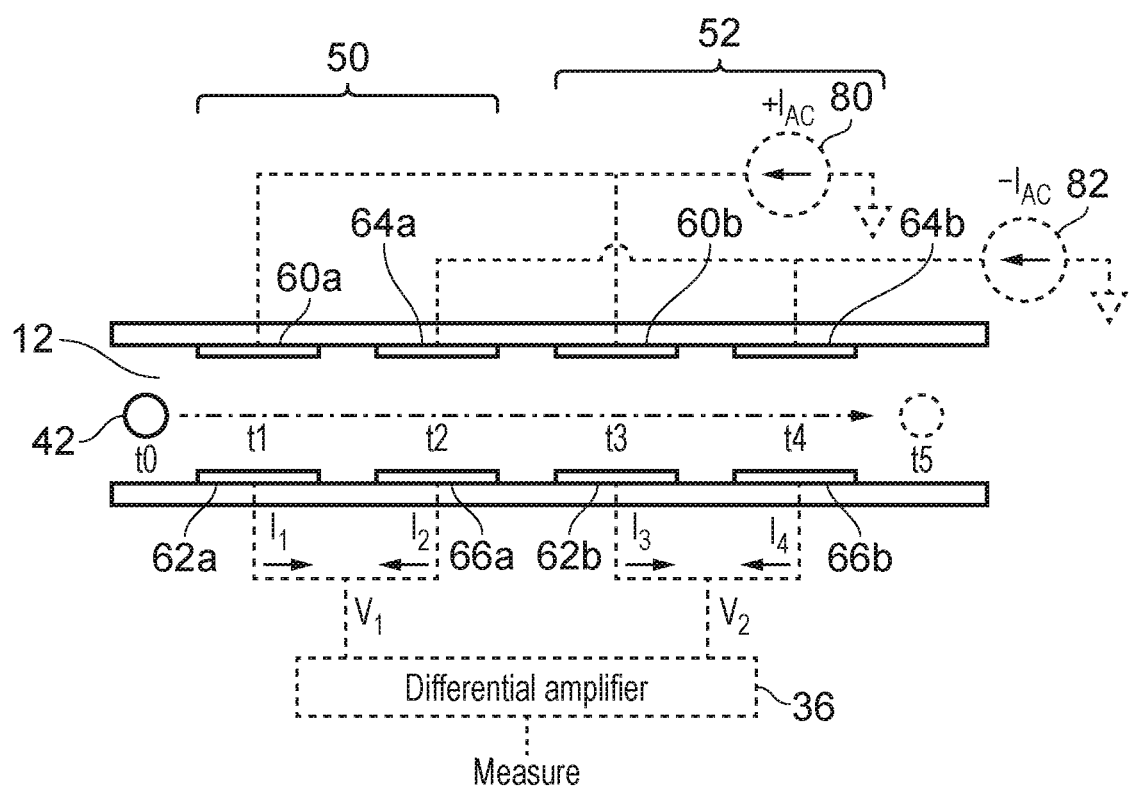
FIG. 14 shows a schematic cross-sectional side view of an electrode and circuitry configuration for an impedance flow cytometer according to another example.

As has been noted, the apparatus may be driven using voltages or currents applied to the signal electrodes. FIG. 14 shows an example apparatus configured as the FIG. 4 example, but using current sources in place of voltage sources. Components are otherwise the same so are not described in detail here. A first current source 80 provides a current with a magnitude, phase and frequency composition to the first signal electrodes 60a, 60b of each of the first and second electrode groups 50, 52. A second current source 82 provides a current with substantially the same magnitude and phase to the second signal electrodes 64a, 64b of each electrode group 50, 52, but which is negative compared to the current from the first current source 80 in that it has an opposite or approximately opposite phase (the phase difference between the two currents is about 180° or $\pi$ radians). Voltages V1 and V2 representing the summed signals from the measurement electrodes 62a, 66a, 62b, 66b of each electrode group 50, 52 are input to a differential amplifier 36 to allow the differential signal to be determined.

Figure 15:
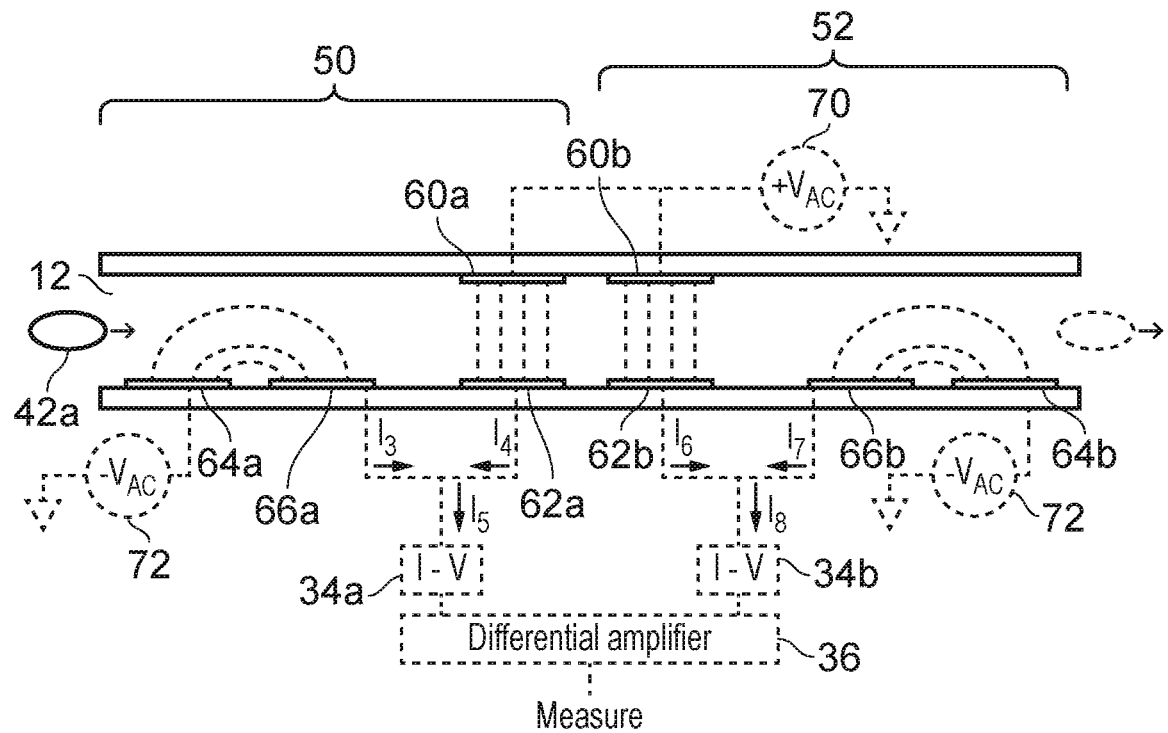
FIG. 15 shows a schematic cross-sectional side view of an electrode and circuitry configuration for an impedance flow cytometer according to an example with differently orientated current paths.

FIG. 15 shows a further example apparatus, with an alternative arrangement of electrodes. Eight electrodes are provided to define four current paths, in two groups each comprising a first current path and a second current path, as in some preceding examples. However, while preceding examples have comprised only one current path orientation within a single system, the FIG. 15 example includes two orientations of current path, which enables additional information to be determined about particles in a sample.

In particular, the apparatus is configured so that in each of the first electrode group 50 and the second electrode group 52, there is a current path which is substantially transverse to the fluid flow direction (as in the arrangements of FIGS. 8(a) to 8(e), for example) and a current path which is substantially parallel to the fluid flow direction (as in the arrangement of FIG. 8(f)). In the first electrode group 50, a first signal electrode 60a supplied with +V from a voltage source 70 is arranged above the channel, opposite to a first measurement electrode 62a below the channel, to define a first current path transverse to the flow direction, from which a current I4 is measured. A second signal electrode 64a supplied with −V from a voltage source 72 is arranged below the channel adjacent to a second measurement electrode 66a also below the channel, to define a second current path which is parallel to the flow direction, from which a current I3 is measured. As before, I3 and I4 are combined to produce a first summed signal I5, from the first electrode group 50. Similarly, in the second electrode group 52, a further first signal electrode 60b is opposite to a further first measurement electrode 62b to define a transverse first current path I6, and a further second signal electrode 64b is adjacent to a further second measurement electrode 66b to define a parallel second current path I7. I6 and I7 are combined to generate the second summed signal I8, and as in previous examples, the summed signals are handled by current to voltage converters 34a, 34b and a differential amplifier 36 to determine a differential signal.

The provision of differently oriented current paths along the same flow path can reveal information about particle shape. In the absence of any particle, the magnitudes of the various current paths are approximately equal, summing to approximately zero, as before. In the presence of a spherical or near-spherical particle, as described with respect to FIGS. 4-7, the impedance signals measured for transverse current paths have approximately the same magnitude as the impedance signals measured for parallel current paths. However, if a particle 42a is non-spherical, such as an elongate rod-shaped bacteria (for example a *bacillus*), it will interact by different amounts with the two current path directions, giving differently-sized signals. If the elongate particle has its longest axis arranged along the channel flow direction, it will produce a larger change in the transverse current path than in the parallel current path. Accordingly, the summed signal derived from the two current paths within an electrode group will be different for an elongate particle compared to a spherical particle, the difference being related to the degree by which the particle shape differs from a sphere (in other words, its degree of eccentricity or elongateness). Therefore, obtaining the summed signals from current paths of two different orientations (such as a transverse path and a parallel path) can indicate information about particle eccentricity or shape. This is useful for distinguishing between different types of bacteria, such as bacilli (rods) and cocci (spheres), or identifying chains of bacteria.

The external shape of a particle can reveal other properties. For example, if the flow of the sample fluid through the cytometer channel creates sufficient shear stress, a cell can be deformed or squashed as it travels along the channel. Softer cells will be deformed more than stiffer cells, acquiring a greater degree of eccentricity. Accordingly, an arrangement as in the FIG. 15 example, having current paths of different orientations that can detect cell eccentricity, can additionally be used to distinguish or determine mechanical properties of particles. A softer particle will produce different summed signals and differential signal than a stiffer particle, owing to the different shape induced by the flow.

Figure 16:
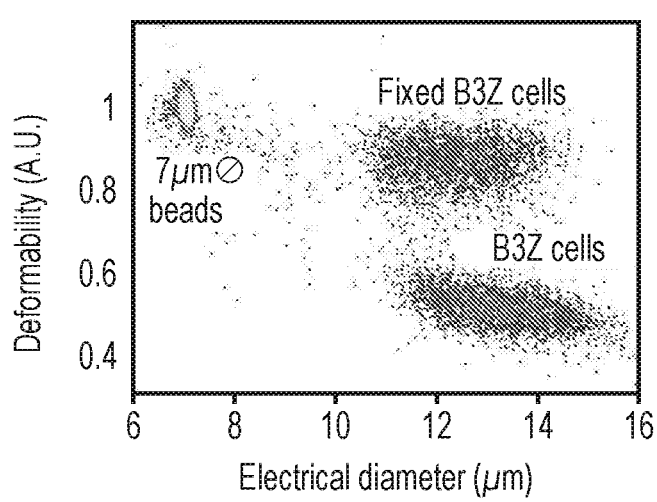
FIG. 16 shows an example scatter plot of impedance magnitude data obtained using an impedance flow cytometer according to the example of FIG. 15.

Note that the electrodes might be positioned to provide the two orientations of current path in a different order along the flow direction than that shown in FIG. 15. FIG. 16 shows a scatterplot of impedance data obtained from two different cell types. As before, each data point represents a single particle in a sample. The vertical axis shows a "deformability" measure, obtained by dividing the impedance signal from one or more parallel current paths by the impedance signal from one or more transverse current paths. The horizontal axis indicates the electrical diameter of the particles, obtained by averaging the impedance signals from the two measurement directions, which approximates cell size. Alternatively, the diameter might be obtained in line with the measurement of electrical radius discussed with regard to FIG. 11. Measurements were obtained for two groups of B3Z cells, which have a spherical shape. One group was modified by a fixing treatment with glutaldehyde to increase the membrane stiffness. Note that the measurement could be made on a single sample containing both groups of cells, or on two samples, each containing one group. The cells in the two groups therefore have different mechanical properties, and appear on the scatterplot as two well-separated populations. Measurements of a reference population of 7 μm beads is also indicated. The fixed, stiffer, cells remain substantially spherical in the fluid flow along the channel, so the impedance signals measured for the two orthogonal current paths are similar. Hence the deformability for these cells is measured as near to 1 arbitrary unit. In contrast, the unfixed cells are deformed by the flow and stretch out along the channel direction. Accordingly, the impedance signals measured along the channel direction are reduced compared to the measurements across the channel, and the deformability measure is reduced below 1 AU. In this example, it is measured at about 0.5 AU. Thus, mechanical properties of individual cells and populations of cells can be identified, and different cell populations can be distinguished one from another.

Figure 17:
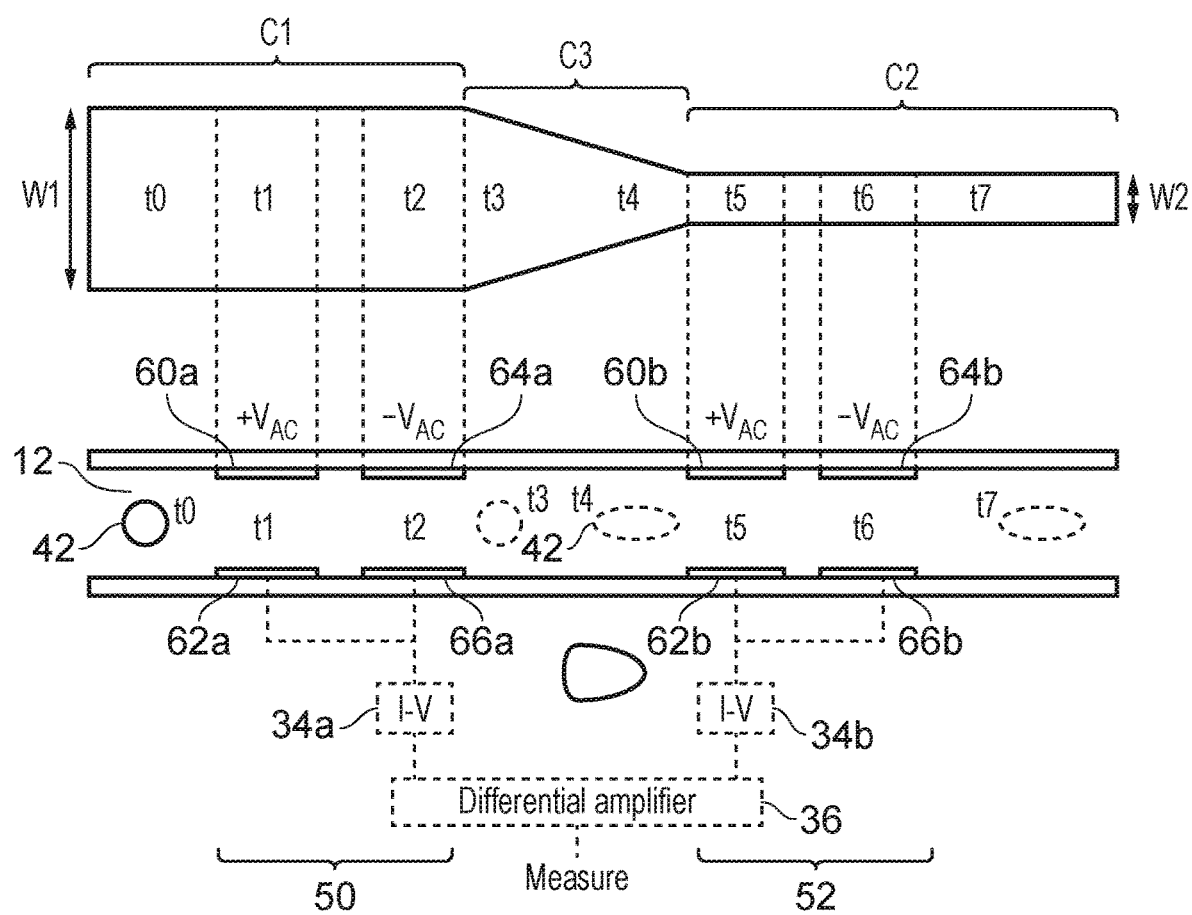
FIG. 17 shows a schematic cross-sectional side view of an electrode and circuitry configuration for an impedance flow cytometer according to an example with a varying width of flow channel.

FIG. 17 shows a still further example apparatus, in which the flow channel 12 has a non-uniform cross-sectional area/shape. The apparatus comprises a first electrode group 50 and a second electrode group 52, configured in accordance with preceding descriptions to provide first and second current paths in each group, which in this example are transverse to the flow direction along the channel 12. The apparatus differs from previous examples in that the width of the channel changes along the channel's extent (fluid flow direction). The channel 12 comprises a first region C1 in which the first electrode group 50 is accommodated, and a second region C2 in which the second electrode group 52 is accommodated, and which has a different channel width W2 from the width W1 of the first region C1. In this example the second region C2 has a smaller channel width than the first region, but the opposite arrangement might be used. The width of the channel is indicated by the striped bar at the top of the Figure. The width W is along the channel dimension which is orthogonal to the direction of the transverse current paths and to the flow direction along the channel 12. As illustrated, it is the direction into the plane of the page. The dimension along the current paths remains constant along the extent of the channel, so the current paths are all the same length. The narrower channel in the second region C2 increases the shear stress of the fluid flow, which can lead to a shape change of cells if their membranes/walls are not too stiff, and similarly of other particles which are sufficiently deformable. Hence, impedance measurements from the first electrode group 50 and the second electrode group 52 will differ if the particle shape changes between the two regions, reflecting the mechanical properties of the particle. As shown, a spherical particle 42 travels along the first channel region C1 with width W1 and through the first electrode group 50, between times t0 and t3. A first summed signal is obtained from the first electrode group 50. The channel then comprises an intermediate portion C3 over which the channel width gradually reduces from W1 to W2. This width reduction increases the shear stress and deforms the particle 42 so that at time t4, as it is entering the second region C2 is has an elliptical shape. From time t4 to t7, the particle 42 retains its spherical shape and travels along the narrower second region, past the second electrode group 52 from which a second summed signal is obtained. The second summed signal will have a different magnitude from the first summed signal owing the changed shape of the particle, so the final differential signal will reflect the amount by which the shape altered, which depends on the mechanical properties of the particle 42. Hence mechanical properties of particles can be measured.

Note that the variation of the flow channel width over the extent of the flow channel can be configured differently than in the FIG. 17 example, and might include more than two regions with different widths. The width may become greater or smaller along the flow direction, and may or may not be constant over the extent of an individual electrode group.

An impedance flow cytometer according to the examples and embodiments herein offers a number of benefits. Testing and measurements can be carried out quickly and with an improved sensitivity, particularly for smaller particles such as bacteria. The apparatus can be compact, potentially portable, and inexpensive. A chip-based format lends itself to mass production, and scalability for multiple simultaneous tests. In the context of testing bacterial susceptibility to antibiotics, tests can be prompt and simple, and inexpensive since no dye or other labelling medium is required. This also enables continuous monitoring of the response of any given sample to antibiotics over an extended time period, which is not possible in dye-based testing procedures such as optical cytometry.

Apparatus configured as described herein may be used to measure and analyse particles of non-biological origin, so examples of the apparatus may be considered more generally as particle impedance measurement apparatus, where any individual apparatus may be configured (for example as regards its dimensions) for use with biological particles (in particular cells which may or may not be bacteria) or non-biological particles, or any particle type. The terms "impedance flow cytometer" and "impedance flow cytometry apparatus" are intended to cover any apparatus as described herein regardless of its intended application.

Note also that in some instances, the impedance measurements obtained from an apparatus according to any of the various examples may usefully be compared with (correlated to) measurements of optical properties obtained from the same particles or types of particles. This could, for example, be done to verify either the impedance measurements or the optical measurements, or to produce a further level of information. The processor configured to determine the impedance signal can be configured receive any such optical data and perform the correlation.

In the various example configurations for the apparatus, the pairs of electrodes (a signal electrode and its corresponding or associated measurement electrode together creating a current path) may be uniformly spaced along the length of the channel (along the flow direction), giving uniform spacing for the current paths. This is not essential, however.

Also, the apparatus may comprises additional electrodes (signal conditioning electrodes) not providing the current paths which are held at a potential to prevent or inhibit current flow between electrodes which are not associated as a pair for providing a current path. This can minimise interference or cross-talk between the current paths, which would disrupt the summed signals and reduce the accuracy of the impedance signal. The condition of the signal is thereby improved.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] WO 2012/164547

The invention claimed is:

1. Impedance flow cytometry apparatus comprising:
 a flow channel for carrying a flow of fluid comprising particles suspended in an electrolyte from an inlet to an outlet;
 a first electrode group and a second electrode group, each electrode group providing first and second current paths through fluid flowing in the flow channel;
 wherein each electrode group comprises:
  a first signal electrode to provide to the first current path a first electric signal of frequency, magnitude and phase;
  a second signal electrode to provide to the second current path a second electrical signal of substantially equal frequency and magnitude as the first electrical signal and of opposite phase to the first electrical signal; and
  one or more measurement electrodes to detect current flow in the first current path and the second current path and produce a summed signal representing the sum of the current flow in the first current path and the current flow in the second current path;
   wherein the first electrode group produces a first summed signal and the second electrode group produces a second summed signal; and
 circuitry to determine a differential signal representing the difference between the first summed signal and the second summed signal.

2. Impedance flow cytometry apparatus according to claim 1, further comprising a processor configured to receive the differential signal, and calculate and output an impedance signal representing impedance properties of particles in fluid flowing in the flow channel.

3. Impedance flow cytometry apparatus according to claim 2, in which the processor is configured to identify, within the impedance signal, impedance values arising from the particles in the fluid.

4. Impedance flow cytometry apparatus according to claim 1, further comprising a processor configured to receive the differential signal, and identify within the differential signal occurrences of differential values arising from the presence of particles in the fluid flowing in the channel.

5. Impedance flow cytometry apparatus according to claim 2, in which the processor is configured to calculate and output an impedance signal corresponding to each of one or more frequencies comprised in the first and second electrical signals.

6. Impedance flow cytometry apparatus according to claim 5, in which the one or more frequencies comprises a low frequency and a high frequency larger than the low frequency.

7. Impedance flow cytometry apparatus according to claim 2, in which the processor is further configured to correlate the impedance signal with measurements of optical properties of the particles.

8. Impedance flow cytometry apparatus according to claim 1, in which, within an electrode group, the one or more measurement electrodes comprise a first measurement electrode to detect current flow in the first current path and a second measurement electrode to detect current flow in the second current path.

9. Impedance flow cytometry apparatus according to claim 1, in which, within an electrode group, the one or more measurement electrodes comprises a single electrode to detect current flow in both the first current path and the second current path.

10. Impedance flow cytometry apparatus according to claim 1, in which, within an electrode group, the one or more measurement electrodes are configured to produce a summed current, being the sum of the current flow in the first current path and the current flow in the second current path, and the electrode group has an associated current-to-voltage converter to convert the summed current to a voltage which is output as the summed signal from the electrode group.

11. Impedance flow cytometry apparatus according to claim 1, in which an electrode group has associated current-to-voltage converters to convert the detected current flow in the first current path and the detected current flow in the second current path into voltages, which are summed to obtain the summed signal from the electrode group.

12. Impedance flow cytometry apparatus according to claim 1, in which the first signal electrode of the first electrode group and the first signal electrode of the second electrode group, or the second signal electrode of the first electrode group and the second signal electrode of the second electrode group, comprise a single signal electrode shared by the first electrode group and the second electrode group.

13. Impedance flow cytometry apparatus according to claim 1, in which the signal electrodes are located substantially opposite to the measurement electrodes to provide current paths substantially transverse to a direction of flow in the flow channel from the inlet to the outlet.

14. Impedance flow cytometry apparatus according to claim 13, in which the signal electrodes and the measurement electrodes are arranged as electrode pairs each defining a current path, the electrode pairs having a substantially uniform spacing along the flow channel.

15. Impedance flow cytometry apparatus according to claim 1, in which signal electrodes and measurement electrodes of each current path are located on a same side of the flow channel to provide current paths substantially along a direction of flow in the flow channel from the inlet to the outlet.

16. Impedance flow cytometry apparatus according to claim 1, in which at least one current path is substantially transverse to a direction of flow in the flow channel from the inlet to the outlet, and at least one current path is substantially parallel to the direction of flow.

17. Impedance flow cytometry apparatus according to claim 16, in which in each of the first electrode group and the second electrode group, one of the first current path and the second current path is substantially transverse to the direction of flow and the other of the first current path and the second current path is substantially parallel to the direction of flow.

18. Impedance flow cytometry apparatus according to claim 1, in which, within an electrode group, the electrodes are arranged such that the first current path and the second current path are at different positions along a direction of flow in the flow channel from the inlet to the outlet.

19. Impedance flow cytometry apparatus according to claim 1, in which each electrode group comprises additional signal electrodes and measurement electrodes to provide one or more further pairs of first and second current paths.

20. Impedance flow cytometry apparatus according to claim 1, in which a cross-sectional size of the flow channel in a plane orthogonal to a direction of flow in the flow channel from the inlet to the outlet varies along the direction of flow.

21. Impedance flow cytometry apparatus according to claim 20, in which the flow channel comprises a first region associated with the first electrode group and having a first cross-sectional size, and a second region associated with the second electrode group and having a second cross-sectional size different from the first cross-sectional size.

22. Impedance flow cytometry apparatus according to claim 1, and further comprising one or more signal conditioning electrodes positioned and held at potential so as to minimise current flow between signal electrodes and measurement electrodes which are not associated with a same current path.

23. Impedance flow cytometry apparatus according to claim 1, further comprising one or more electrical signal sources to supply the signal electrodes with the first and second electrical signals, wherein the one or more electrical signal sources comprise one or more voltage sources or one or more current sources.

24. Impedance flow cytometry apparatus according to claim 23, in which the one or more electrical signal sources are operable to supply first and second electrical signals comprising one or more frequency components.

25. Impedance flow cytometry apparatus according to claim 24, in which the one or more frequency components comprise a low frequency, and a high frequency greater than the low frequency.

26. Impedance flow cytometry apparatus according to claim 25, in which the low frequency is in the range of 10 MHz or less, and the high frequency is in the range of 10 MHz or more.

27. Impedance flow cytometry apparatus according to claim 1, in which the flow channel is a microfluidic flow channel defined in a layered substrate.

28. A microfluidic device for use in impedance flow cytometry and comprising:
a layered substrate having a fluid flow channel defined in a layer of the substrate and having an inlet and an outlet, the inlet for receiving fluid comprising particles suspended in an electrolyte to flow along the flow channel to the outlet;
electrodes deposited as layers above and below the flow channel, the electrodes comprising:
a first electrode group and a second electrode group, each electrode group providing first and second current paths through fluid flowing in the flow channel;
wherein each electrode group comprises:
a first signal electrode to provide to the first current path a first electrical signal of frequency, magnitude and phase;
a second signal electrode to provide to the second current path a second electrical signal of substantially equal frequency and magnitude as the first electrical signal and opposite in phase to the first electrical signal; and
one or more measurement electrodes to detect current flow in the first current path and the second current path;
input electrical connections configured to enable the connection of one or more electrical signal sources to supply the first and second electrical signals to the first and second signal electrodes; and
output electrical connections configured to connect the measurement electrodes to circuitry operable to produce, for each electrode group, a summed signal representing the sum of the current flow in the first current path and the current flow in the second current path, wherein the first electrode group produces a first summed signal and the second electrode group produces a second summed signal, and also to determine a differential signal representing the difference between the first summed signal and the second summed signal.

29. A microfluidic device according to claim 28, further comprising at least one additional microfluidic channel with associated first and second electrode groups.

\* \* \* \* \*